US010417830B2

(12) United States Patent
Khalid et al.

(10) Patent No.: US 10,417,830 B2
(45) Date of Patent: *Sep. 17, 2019

(54) METHODS AND SYSTEMS FOR DELIVERING INDEPENDENTLY-CONTROLLABLE INTERACTIVE MEDIA CONTENT

(71) Applicant: Verizon Patent and Licensing Inc., Arlington, VA (US)

(72) Inventors: Mohammad Raheel Khalid, Budd Lake, NJ (US); Ali Jaafar, Morristown, NJ (US); Dan Sun, Bridgewater, NJ (US); Christian Egeler, Basking Ridge, NJ (US); John Gu, Rockaway, NJ (US); Jyotsna Kachroo, Millburn, NJ (US); Danny C. Lui, Belle Mead, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/967,469

(22) Filed: Apr. 30, 2018

(65) Prior Publication Data

US 2018/0247460 A1 Aug. 30, 2018

Related U.S. Application Data

(63) Continuation of application No. 15/087,891, filed on Mar. 31, 2016, now Pat. No. 9,990,775.

(51) Int. Cl.
*G06T 19/00* (2011.01)
*H04N 21/2343* (2011.01)
(Continued)

(52) U.S. Cl.
CPC ............ *G06T 19/006* (2013.01); *G06F 3/048* (2013.01); *G06T 15/20* (2013.01);
(Continued)

(58) Field of Classification Search
CPC ........ H04N 21/234363; H04N 21/6405; G06T 19/006
(Continued)

(56) References Cited

U.S. PATENT DOCUMENTS 8,624,960 B2 1/2014 Unkel et al.
8,717,294 B2 5/2014 Weising et al.
(Continued)

*Primary Examiner* — Martin Mushambo

(57) ABSTRACT

An exemplary system generates a plurality of different content files each including data representative of content of a virtual reality world, and provides the plurality of different content files to a media player device via a network. In particular, the generated and provided plurality of different content files comprises at least one of a plurality of uniform-resolution content files and a plurality of mixed-resolution content files. The plurality of uniform-resolution content files are each associated with a different respective center point within the virtual reality world. The plurality of mixed-resolution content files each correspond to one respective content sector of a plurality of partially overlapping content sectors that together form a view of the virtual reality world associated with a single center point, the one respective content sector being encoded in a high resolution while a remainder of the content sectors are encoded in a low resolution.

20 Claims, 19 Drawing Sheets

(51) Int. Cl.
  *H04W 4/06* (2009.01)
  *H04N 5/232* (2006.01)
  *G06F 3/048* (2013.01)
  *H04N 21/8545* (2011.01)
  *H04N 21/6405* (2011.01)
  *H04N 21/81* (2011.01)
  *G06T 15/20* (2011.01)
  *H04N 21/414* (2011.01)
  *H04N 21/61* (2011.01)
  *H04N 21/4223* (2011.01)

(52) U.S. Cl.
  CPC ..... *H04N 5/23206* (2013.01); *H04N 5/23238* (2013.01); *H04N 21/23439* (2013.01); *H04N 21/234363* (2013.01); *H04N 21/41407* (2013.01); *H04N 21/6131* (2013.01); *H04N 21/6405* (2013.01); *H04N 21/8146* (2013.01); *H04N 21/8545* (2013.01); *H04W 4/06* (2013.01); *H04N 21/4223* (2013.01)

(58) Field of Classification Search
  USPC ........................................... 345/633
  See application file for complete search history.

(56) References Cited

U.S. PATENT DOCUMENTS

| | | | |
|---|---|---|---|
| 2005/0062869 A1* | 3/2005 | Zimmermann | G02B 13/06 348/335 |
| 2010/0007582 A1 | 1/2010 | Zalewski | |
| 2015/0346832 A1 | 12/2015 | Cole et al. | |
| 2016/0065947 A1* | 3/2016 | Cole | H04N 13/239 348/43 |
| 2017/0251181 A1 | 8/2017 | Smolyanskiy et al. | |

* cited by examiner

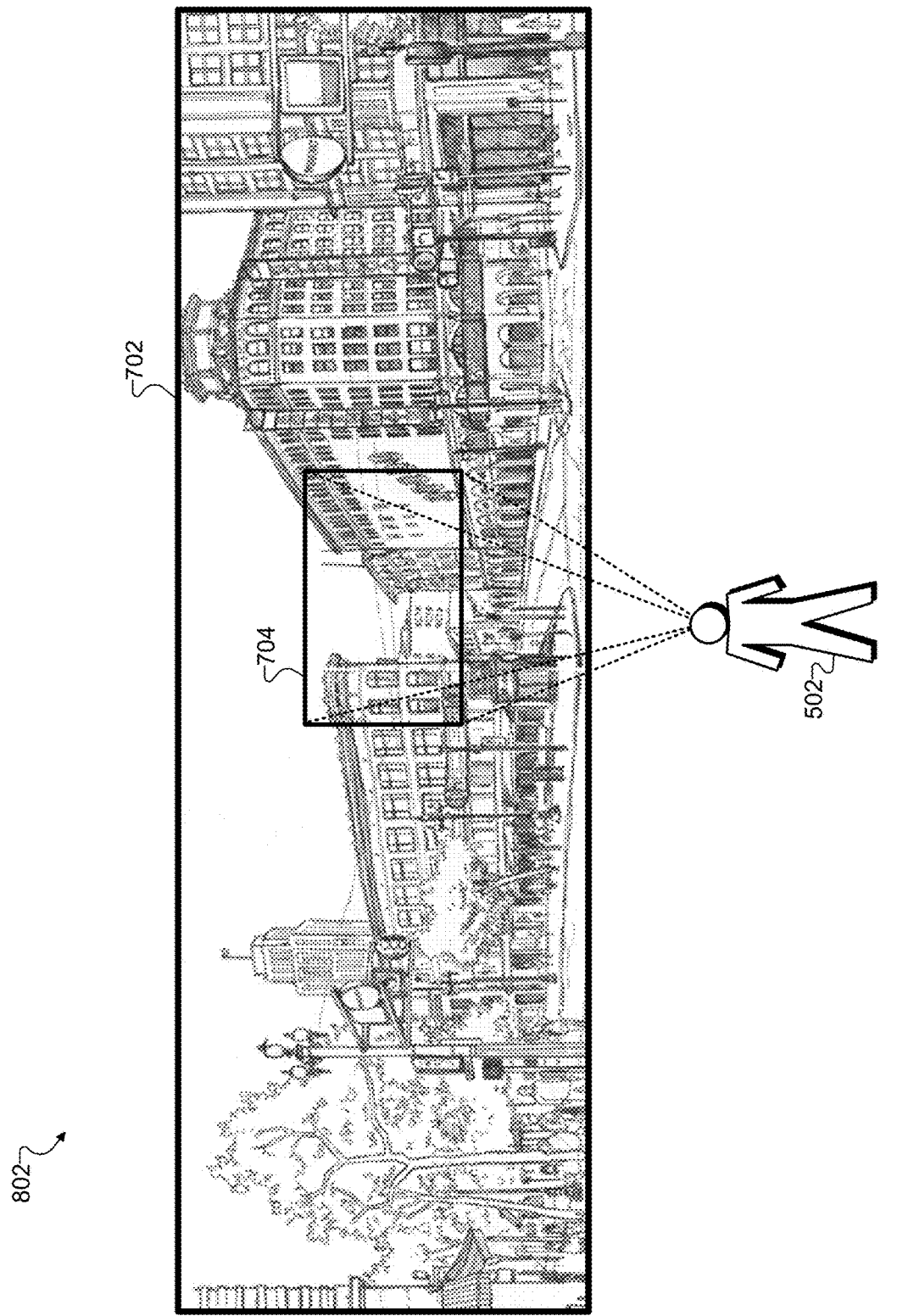

Fig. 11

METHODS AND SYSTEMS FOR DELIVERING INDEPENDENTLY-CONTROLLABLE INTERACTIVE MEDIA CONTENT

RELATED APPLICATIONS

This application is a continuation application of U.S. patent application Ser. No. 15/087,891, filed Mar. 31, 2016, and entitled "Methods and Systems for Point-to-Multipoint Delivery of Independently-Controllable Interactive Media Content," which is hereby incorporated by reference in its entirety.

BACKGROUND INFORMATION

Advances in computing and networking technology have made new forms of media content possible. For example, interactive media content is available that viewers (or "users") may not only watch, but actively participate in as well. One type of interactive media content is interactive television, where media content programs may include embedded code that implements games and/or other interactive features that users may select or otherwise use to participate in the interactive television programs. For instance, code embedded within an interactive television program may allow a user to have an influence on a narrative of the interactive television program (e.g., by choosing what decisions a protagonist of the interactive television program makes to influence how the narrative proceeds).

Another type of interactive media content is virtual reality media content, which may immerse users into interactive virtual reality worlds that the users may interact with (or "experience") by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world.

Interactive media content may be configured to be independently controllable in the sense that each user may view and/or experience the interactive media content differently (e.g., viewing different narratives in interactive television media content based on decisions each user makes, experiencing different areas of an immersive virtual reality world at different times based on where each user looks, etc.). As a result, specific data representative of specific parts of independently-controllable interactive media content (e.g., parts tailored to specific interactions of each user with the interactive media content) are traditionally transmitted to each user by way of point-to-point (i.e., unicast) media delivery protocols. However, when a large number of users desires to view or experience the same independently-controllable interactive media content, point-to-point media delivery protocols may be inefficient and/or may place an undesirable burden on systems and/or networks providing and/or carrying the data representative of the interactive media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 9 illustrates content of the exemplary immersive virtual reality world of FIG. 7 as the content may be represented within the overall data of FIG. 8 according to principles described herein.

FIG. 11 illustrates exemplary overall data for the immersive virtual reality world of FIGS. 10A and 10B including content files corresponding to each of the content sectors shown in FIGS. 10A and 10B according to principles described herein.

DETAILED DESCRIPTION OF PREFERRED EMBODIMENTS

Figure 1:
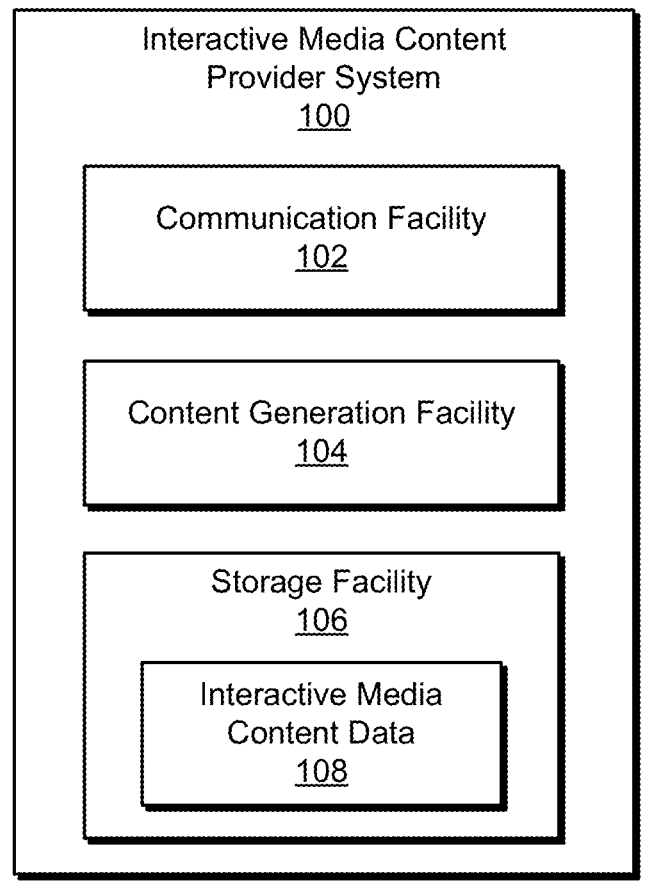
FIG. 1 illustrates an exemplary interactive media content provider system configured to perform point-to-multipoint delivery of independently-controllable interactive media content according to principles described herein.

Methods and systems for performing point-to-multipoint delivery of independently-controllable interactive media content are described herein. Specifically, as will be described and illustrated below, interactive media content that may be independently controlled (i.e., interacted with, experienced, etc.) by different users associated with different media player devices may be delivered from an interactive media content provider system (e.g., a server operated and/or maintained by an interactive media content provider) to the media player devices associated with the different users. The interactive media content may include interactive television media content, virtual reality media content, and/or any other interactive media content that may serve a particular implementation.

For example, for point-to-multipoint delivery of virtual reality media content, an interactive media content provider system may generate overall data representative of an immersive virtual reality world. The immersive virtual reality world may be fully immersive in the sense that the immersive virtual reality world may not be integrated with any image of the real world in which a user is located while the user is experiencing the immersive virtual reality world (i.e., in contrast to certain "augmented reality" technologies). However, while real-world scenery directly surrounding the user may not be presented together with the immersive virtual reality world, the immersive virtual reality world may, in certain examples, be generated based on data (e.g., image and/or audio data) representative of camera-captured real-world scenery rather than animated or computer-generated scenery of imaginary worlds such as those commonly generated for video games, animated entertainment programs, and so forth. For example, as will be described in more detail below, camera-captured real-world scenery may include real-world places (e.g., city streets, buildings, landscapes, etc.), real-world events (e.g., sporting events, large celebrations such as New Year's Eve or Mardi Gras, etc.), fictionalized live action entertainment (e.g., virtual reality television shows, virtual reality movies, etc.), and so forth. Additionally, as will further be described below, the overall data representative of the immersive virtual reality world may include one or more content files that may include data representative of content of the immersive virtual reality world (e.g., real-world scenery, virtual scenery, real or virtual objects, etc.) encoded at one or more resolutions (i.e., levels of detail and/or quality).

After generating the overall data representative of the immersive virtual reality world, the interactive media content provider system may concurrently provide the overall data to a plurality of media player devices each associated with a different user. Rather than providing the data in a unicast stream to each of the different users, the interactive media content provider system may provide the overall data by way of a point-to-multipoint media delivery protocol such as a Multimedia Broadcast Multicast Service ("MBMS") protocol performed using a Long Term Evolution ("LTE") wireless platform. In some examples, the term "eMBMS" may be used to refer to the MBMS protocol performed using the LTE wireless platform. Examples of overall data that is generated and provided to media player devices (e.g., over eMBMS or another point-to-multipoint media delivery protocol) will be described in more detail below.

Each of the media player devices to which the overall data is provided may be associated with a user, and may be configured to render a portion of the overall data within a field of view presented on a display screen of the media player device. For example, each media player device may render, within the respective field of view of that media player device, a portion of the overall data that dynamically changes to continually correspond to an area of the immersive virtual reality world to which the user directs the field of view (also referred to herein as an "observed area" of the immersive virtual reality world).

The user may experience the immersive virtual reality world by way of the field of view. For example, content of the immersive virtual reality world (e.g., images depicting scenery and objects surrounding the user within the immersive virtual reality world) may be included (i.e., displayed or presented) within the field of view, and the field of view may dynamically change in response to user input provided by the user as the user experiences the immersive virtual reality world. For instance, the media player device may detect user input (e.g., moving or turning the display screen upon which the field of view is presented) that represents a request to shift additional content into the field of view in place of the previous content included within the field of view. In response, the field of view may display the additional content in place of the previous content. In this way, the field of view may essentially provide the user a "window" through which the user can easily and naturally look around the immersive virtual reality world.

In certain examples, a first field of view presented on a first media player device associated with a first user and a second field of view presented on a second media player device associated with a second user may be independently controlled by the first and second users, respectively. More specifically, the first field of view may be independently directed by the first user and the second field of view may be independently directed by the second user such that the first portion of the overall data rendered within the first field of view may be different from the second portion of the overall data rendered within the second field of view at a particular point in time.

Several benefits may arise from the methods and systems for point-to-multipoint delivery of independently-controllable interactive media content described herein. For example, a large number of users may be interested in viewing, experiencing, and/or capturing (e.g., on a time-shifted media content recording device such as a Digital Video Recorder ("DVR")) particular interactive media content associated with a time-sensitive event (e.g., a live sporting event or news event, a scheduled airing of a television show or other program, etc.) at the same time or at similar times. By distributing the interactive media content using a point-to-multipoint media delivery protocol (e.g., a multicast protocol, a broadcast protocol, etc.), an interactive media content provider system providing (i.e., transmitting) the interactive media content may significantly reduce a processing burden as compared to distributing the interactive media content to the large number of users using a point-to-point media delivery protocol (e.g., a unicast protocol). More specifically, rather than generating and transmitting a large plurality of point-to-point data streams to distribute the interactive media content to a large number of media player devices, the interactive media content provider system may generate and transmit just one point-to-multipoint data stream to distribute the interactive media content to the large number of media player devices. Additionally, a load on one or more network components (e.g., servers, routers, switches, etc.) carrying the overall data representative of the interactive media content may be significantly reduced when the point-to-multipoint media delivery protocol is used to transmit a single point-to-multipoint (e.g., broadcast or multicast) data stream rather than the point-to-point media delivery protocol being used to transmit a large number of point-to-point (e.g., unicast) data streams.

Moreover, these and other significant benefits may be associated with the interactive media content provider system and/or to the network carrying the interactive media content while not causing any significant disadvantages for the media player devices and/or users associated with the media player devices. Indeed, a media player device and/or a user using the media player device may be unaware of and/or indifferent to what type of media delivery protocol is used to deliver interactive media content to the media player device.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary interactive media content provider system ("system 100") configured to perform point-to-multipoint delivery of independently-controllable interactive media content. As shown, system 100 may include, without limitation, a communication facility 102, a content generation facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

System 100 may be implemented by or may include one or more devices and/or systems described herein as may serve a particular implementation. For example, while system 100 may be illustrated and/or described as being separate from various systems and devices in certain configurations illustrated and described below, it will be understood that one or more of those systems or devices, as well as one or more other systems or devices not shown, may be combined with and/or may serve to implement at least certain components and/or operations of system 100. As will be described in more detail below, system 100 may maintain, manage, and/or provide (e.g., transmit) overall data representative of interactive media content (e.g., an immersive virtual reality world of virtual reality media content) to media player devices.

Storage facility 106 may maintain interactive media content data 108 received, generated, managed, maintained, used, and/or transmitted by communication facility 102 and/or content generation 104. As will be described in more detail below, interactive media content data 108 may include any data that may facilitate system 100 in performing the point-to-multipoint delivery of independently-controllable interactive media content in a particular embodiment.

Communication facility 102 may perform any suitable communication operations for proper functionality of system 100. For example, communication facility 104 may receive data (e.g., raw data representative of a 360-degree image) from which overall data representative of interactive media content may be generated. Communication facility 104 may also perform any operations to prepare and/or provide (e.g., transmit) the overall data to one or more media player devices by way of a point-to-multipoint media delivery protocol.

Content generation facility 104 may perform any suitable operations for generating and/or preparing the overall data representative of the interactive media content (e.g., overall data representative of an immersive virtual reality world of virtual reality media content) based on data (e.g., raw data) received by communication facility 102. Content generation facility 104 may then supply the overall data to communication facility 102 to be concurrently provided to a plurality of media player devices by way of a point-to-multipoint media delivery protocol, as will be described in more detail below. Content generation facility 104 may also perform other operations described herein as may serve a particular implementation.

Figure 2:
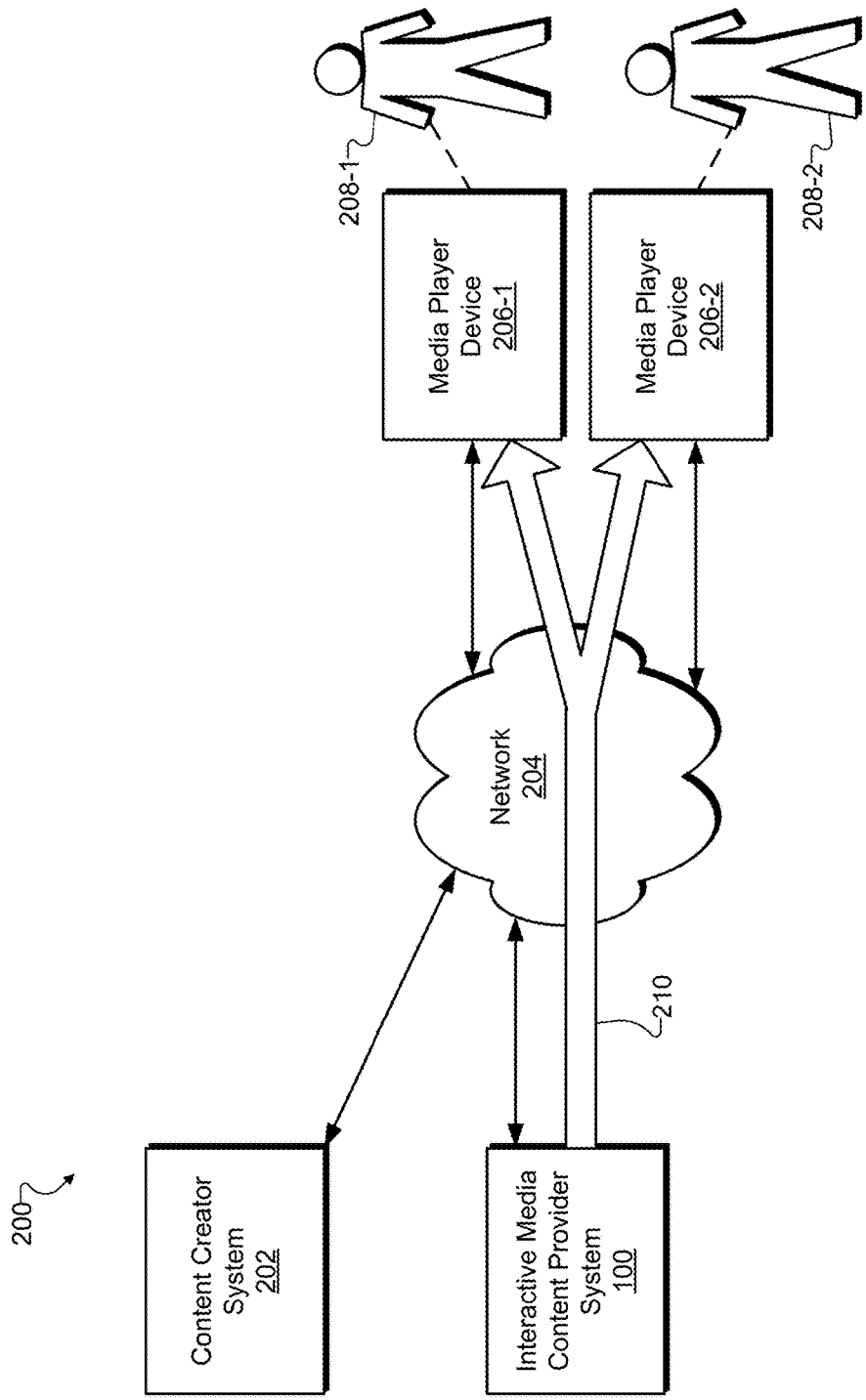
FIG. 2 illustrates an exemplary configuration in which the system of FIG. 1 operates with exemplary implementations of a content creator system and a plurality of media player devices to perform point-to-multipoint delivery of independently-controllable interactive media content according to principles described herein.

FIG. 2 illustrates an exemplary configuration 200 in which system 100 operates with exemplary implementations of a content creator system and a plurality of media player devices to perform point-to-multipoint delivery of independently-controllable interactive media content. Specifically, as shown in configuration 200, system 100 may receive data representative of interactive media content from a content creator system 202, and may concurrently provide overall data representative of the interactive media content over a network 204 to media player devices 206 (e.g., media player devices 206-1 and 206-2), which may be associated with users 208 (e.g., with users 208-1 and 208-2, respectively). In some examples, as shown, the overall data representative of the interactive media content may be concurrently provided to media player devices 206 by way of a point-to-multipoint media delivery protocol 210 ("point-to-multipoint protocol 210"). Each of the elements of configuration 200 will now be described in detail.

Content creator system 202 may include one or more servers or other computing devices associated with (e.g., provided and/or managed by) a content creator such as a television network (e.g., NBC), a cable network (e.g., ESPN), a virtual reality media content network, and/or any other source of interactive media content as may serve a particular implementation. Content creator system 202 may provide to system 100 (e.g., directly or by way of network 204) any data that system 100 may use to generate interactive media content in a particular implementation. For example, content creator system 202 may provide raw data that system 100 may use to generate interactive media content. In other examples, content creator system 202 may provide data to system 100 that is ready to be provided to media player devices 206 for viewing and/or experiencing by users 208.

In configuration 200, system 100 may be implemented by a backend server or other computing device associated with (e.g., provided and/or managed by) an interactive media content service provider (e.g., a network service provider, a cable service provider, a satellite service provider, an Internet service provider, a provider of virtual reality mobile applications, etc.). System 100 may be configured to provide interactive media content to users (e.g., subscribers of an interactive media content service, users who download or otherwise acquire interactive media content mobile applications, etc.) by way of media player devices 206. To this end, system 100 may receive, generate, process, and/or maintain overall data representative of interactive media content. As will be described in more detail below, system 100 may manage and/or distribute the overall data to media player devices 206 in any way that may serve a particular embodiment.

Media player devices 206 may be used by users 208 to access, view, and/or experience interactive media content received from system 100. While two media player devices 206 are shown in FIG. 2 (i.e., media player device, 206-1 and 206-2), it will be understood that configuration 200 may include any number of media player devices 206 associated with any number of users 208. For example, if a large number of users wish to view and/or experience interactive media content at the same time (e.g., to view an interactive media content program associated with a live event), system 100 may concurrently provide overall data representative of the interactive media content to a large number of media player devices 206 each associated with one or more of the users.

Media player devices 206 may each include or be implemented by any device that can detect user input (e.g., user input representative of user interaction from a respective user 208) and/or render at least a portion of the overall data on a display screen associated with the device based on the detected user input. For example, as will be described in more detail below, media player devices 206 may include or be implemented by a head-mounted virtual reality device (e.g., a virtual reality gaming device), a personal computer device (e.g., a desktop computer, laptop computer, etc.), a mobile or wireless device (e.g., a smartphone, a tablet device, a mobile reader, etc.), a television device (e.g., a television, a set-top box, etc.), or any other device or configuration of devices that may serve a particular implementation to facilitate detecting user input and/or presenting interactive media content. As will be described in more detail below, different types of media player devices 206 (e.g., head-mounted virtual reality devices, personal computer devices, mobile devices, television devices, etc.) may provide different types of interactive experiences for users 208.

Media player devices 206 may be configured to allow users 208 to select respective interactive media content programs that users 208 may wish to view and/or experience on their respective media player devices 206. In certain examples, media player devices 206 may download interactive media content programs that users 208 may experience offline (e.g., without an active connection to system 100). In other examples, media player devices 206 may request and receive data streams representative of interactive media content programs that users 208 experience while media player devices 206 remain in active communication with system 100 by way of network 204.

To facilitate users 208 in viewing and/or experiencing interactive media content, each of media player devices 206 may include or be associated with at least one display screen upon which a portion of the interactive media content (e.g., a portion selected based on interaction of a respective user 208 with the interactive media content) may be rendered. Media player devices 206 may also include software configured to receive, maintain, and/or process overall data representative of the interactive media content to select, process, and/or render a portion of the interactive media content to be presented on the display screens of the media player devices. For example, media player devices 206 may include dedicated, standalone software applications (e.g., mobile applications) configured to process and present overall data representative of interactive media content on the displays. In other examples, the software used to present the overall data representative of the interactive media content may include non-dedicated software such as standard web browser applications.

System 100, content creator system 202, and media player devices 206 may communicate with one another using any suitable communication technologies, devices, media, and/or protocols supportive of data communications, including, but not limited to, MBMS, eMBMS, LTE wireless platforms, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 204 may include any provider-specific network (e.g., a cable or satellite carrier network or a mobile telephone network), the Internet, wide area network, or any other suitable network. Data may flow between system 100, content creator system 202, and media player devices 206 by way of network 204 using any communication technologies, devices, media, and protocols as may serve a particular implementation. In particular, as shown, point-to-multipoint protocol 210 (e.g., an eMBMS protocol or other multicast or broadcast protocol) may be used to transmit the overall data representative of the interactive media content, while one or more other protocols, platforms, and/or technologies may be used (i.e., concurrently with the eMBMS communication or prior to the eMBMS communication to set up or initialize the eMBMS communication) to transfer other data, commands, and/or media content as may serve a particular implementation. While only one network 204 is shown to interconnect system 100, content creator system 102, and media player devices 206 in FIG. 2, it will be recognized that these devices and systems may intercommunicate by way of multiple interconnected networks as may serve a particular implementation.

By concurrently providing (i.e., delivering simultaneously or near-simultaneously) the same overall data representative of the interactive media content to media player devices 206-1 and 206-2 by way of point-to-multipoint protocol 210, system 100 may allow users 208-1 and 208-2 to independently control the interactive media content on each of their respective devices. Specifically, media player device 206-1 may render a first portion of the overall data based on user interaction of user 208-1 with the interactive media content, while media player device 206-2 may render a second, different portion of the overall data based on user interaction of user 208-2 with the interactive media content. As a result, the content rendered on the display screens of each of media player devices 206 may be different at any particular point in time, even though both media player devices 206 receive the same overall data representative of the interactive media content from system 100.

Figure 3:
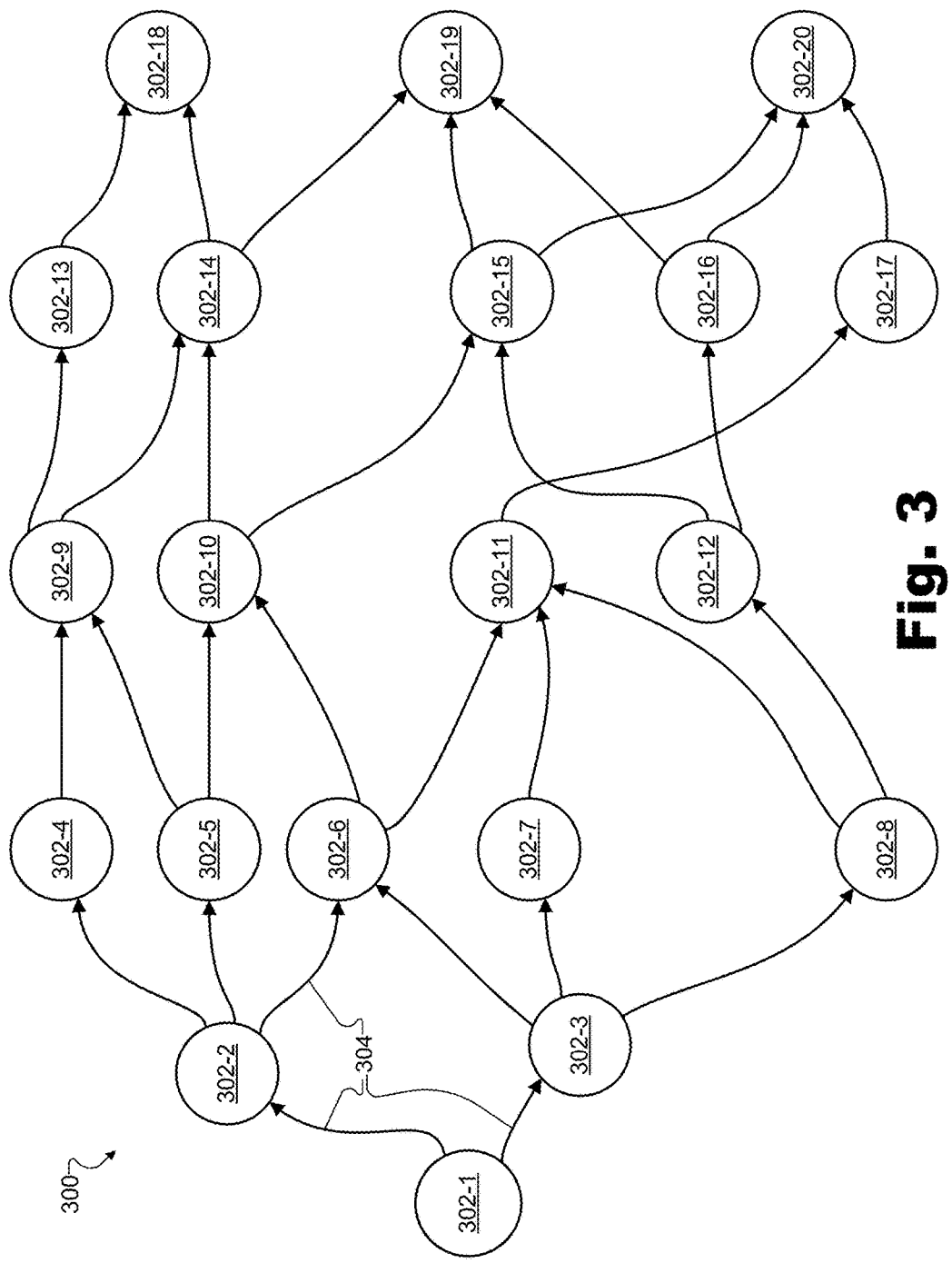
FIG. 3 illustrates an exemplary branching narrative of an interactive television program according to principles described herein.

To illustrate, FIG. 3 shows an exemplary branching narrative 300 of an interactive television program. As mentioned above, overall data representative of an interactive television program may include embedded code that implements a game or includes other interactive features to allow a user to influence how the interactive television program proceeds. For example, an interactive television program may include embedded code configured to present an interactive television program according to a branching narrative that is navigated based on decisions made by the user. Specifically, as shown, branching narrative 300 may include a plurality of different scenes 302 (e.g., scenes 302-1 through 302-20) connected based on decisions 304 that are made by users watching each scene about how the user would like to proceed.

Thus, as one example, system 100 may concurrently provide overall data representative of scene 302-1 to both media player device 206-1 and media player device 206-2 by way of point-to-multipoint protocol 210. Users 208 may each view scene 302-1 and be prompted to make a decision (e.g., a decision to be made vicariously for a protagonist in the interactive television program). User 208-1 may provide user input indicative of one decision, while user 208-2 may provide user input indicative of a different decision. As a result, while system 100 concurrently provides overall data representative of scenes 302-2 and 302-3, media player device 206-1 may render a portion of the overall data representative of scene 302-2 and media player device 206-2 may render a different portion of the overall data representative of scene 302-3. In this way, users 208 may view different parts of branching narrative 300 even though system 100 concurrently provides the same overall data representative of the interactive television program to both media player devices 206. Specifically, user 208-1 may view scene 302-2 (e.g., based on the specific decision 304 that user 208-1 made after scene 302-1) at the same time that user 208-2 views scene 302-3 (e.g., based on the specific decision 304 that user 208-2 made after scene 302-1).

While system 100 concurrently provides overall data representative of scenes 302-2 and 302-3 to both media player devices 206, users 208 may be presented with respective second decisions, based on the respective scenes that each user has viewed. Again, users 208 may each provide user input indicative of a decision 304, which may determine which scene 302 will be presented next. Subsequently, system 100 may concurrently provide overall data representative of scenes 302-4, 302-5, 302-6, 302-7, and 302-8 to both media player devices 306. Based on the decisions 304 made by each respective user 208, media player devices 206 may each render portions of the overall data that correspond to the appropriate scene 302 selected by users 208. For example, media player device 206-1 may render a portion of the overall data corresponding to scene 302-5 while media player device 206-2 may render a portion of the overall data corresponding to scene 302-8. Or, alternatively, both media player devices 206 may render a portion of the overall data corresponding to scene 302-6 if the decisions 304 of each of users 208 happen to have led users 208 to a common scene in branching narrative 300.

The interactive television program may proceed in this manner throughout the rest of branching narrative 300 until system 100 concurrently provides overall data representative of scenes 302-18, 302-19, and 302-20 to both media player devices 206. Scenes 302-18, 302-19, and 302-20 may represent alternative endings to branching narrative 300. Users 208 may each experience one of the alternative endings (e.g., the same or different endings) based on the decisions 304 that the users 208 have each made throughout the interactive television program, and the interactive television program may end after users 208 each experience one of the alternative endings.

As mentioned above, another example of interactive media content is virtual reality media content. Rather than choosing which scenes will be presented next, as with interactive television programs with branching narratives, virtual reality media content provides each user 208 with choices about which direction he or she will look within an immersive virtual reality world. Because overall data representative of an entirety of the immersive virtual reality world may be concurrently provided to both media player devices 206-1 and 206-2, each media player device 206 may present, within respective fields of view, different portions of the immersive virtual reality world based on which direction each user 208 indicates that he or she would like to look within the immersive virtual reality world.

Figure 4:
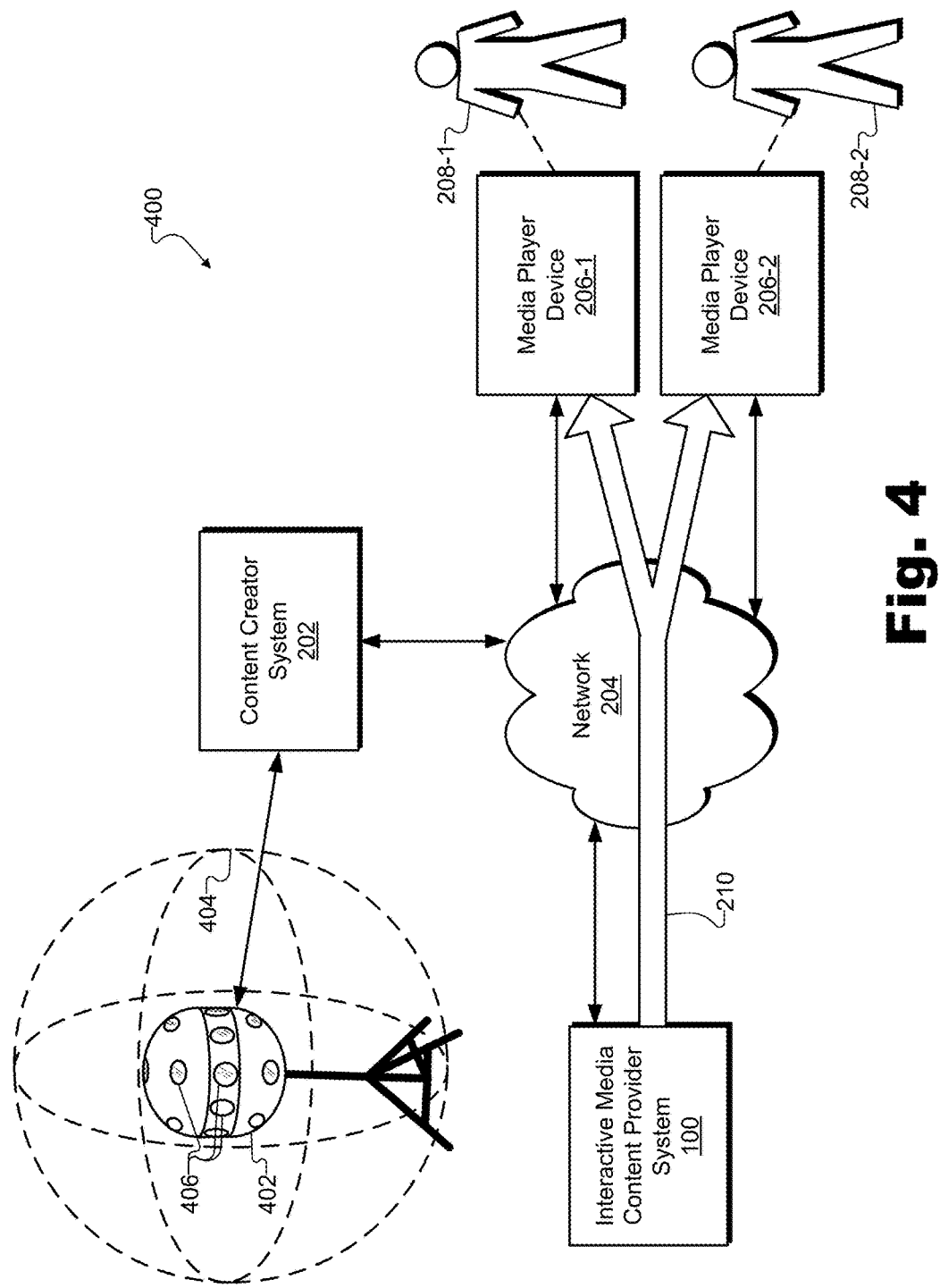
FIG. 4 illustrates an exemplary configuration in which the system of FIG. 1 operates with exemplary implementations of a 360-degree camera, a content creator system, and a plurality of media player devices to perform point-to-multipoint delivery of independently-controllable virtual reality media content according to principles described herein.

To illustrate, FIG. 4 illustrates an exemplary configuration 400 in which system 100 operates with exemplary implementations of a 360-degree camera 402, content creator system 202, and media player devices 206 to perform point-to-multipoint delivery of independently-controllable virtual reality media content according to principles described herein. Specifically, as shown in FIG. 4, 360-degree camera 402 ("camera 402") may capture and/or generate a 360-degree image of real-world scenery 404 around a center point corresponding to camera 402. For example, camera 402 may capture a plurality of images from each of a plurality of segment capture cameras 406 built into or otherwise associated with camera 402, and may generate the 360-degree image of real-world scenery 404 by combining the plurality of images captured by segment-capture cameras 406.

Camera 402 may be incorporated within or otherwise associated with content creator system 202 (described above in relation to FIG. 2). As such, camera 402 may operate (e.g., by way of or as a part of content creator system 202) to capture and process data (e.g., raw data) representative of 360-degree images of real-world scenery 404, and to transmit the data to system 100 by way of network 204 (also described above in relation to FIG. 2). After preparing and/or processing the data representative of the 360-degree images to generate an immersive virtual reality world based on the 360-degree images, system 100 may provide overall data representative of the immersive virtual reality world to media player devices 206 (also described above in relation to FIG. 2). Users 208-1 and 208-2 may use media player devices 206-1 and 206-2, respectively, to experience the immersive virtual reality world.

Camera 402 may be set up and/or operated by a virtual reality content creator and associated with content creator system 202 in any way that may serve a particular implementation. Camera 402 may include any type of camera that is configured to capture data representative of a 360-degree image of real-world scenery 404 around a center point corresponding to camera 402. As used herein, a 360-degree image is any still or video image that depicts the surroundings (e.g., real-world scenery 404) of a center point (e.g., a center point associated with the location of camera 402) on all sides along at least one dimension. For example, one type of 360-degree image may include a panoramic image that depicts a complete 360-degree by 45-degree ring around a center point corresponding to a camera (e.g., camera 402). Another type of 360-degree image may include a spherical image that depicts not only the ring around the center point, but an entire 360-degree by 180-degree sphere surrounding the center point on all sides. In certain examples, a 360-degree image may be based on a non-circular geometric structure. For example, certain 360-degree images may be based on cubes, rectangular prisms, pyramids, and/or other geometric structures that may serve a particular implementation, rather than being based on spheres.

Camera 402 may be configured to capture the data representative of the 360-degree image of real-world scenery 404 in any way that may serve a particular implementation. For example, as shown in FIG. 4, camera 402 may capture various segments of real-world scenery 404 using segment capture cameras 406, which may each capture an image of a single segment of real-world scenery 404 that may be combined (e.g., stitched together) with other segments to generate the 360-degree image of real-world scenery 404. In certain examples, segment capture cameras 406 may each represent a single camera unit (e.g., including a lens and suitable image capture hardware) built into a single 360-degree camera configured to capture 360-degree images. In other examples, camera 402 may include an array of segment capture cameras 406 that are each a single, standalone camera configured to capture standard images (e.g., images depicting less than a 360-degree view) that may later be combined to form the 360-degree image. In yet other examples, camera 402 may include one or more "fish-eye" lenses configured to capture a very wide-angle image (e.g., a spherical image or a semi-spherical image) that can be used as the 360-degree image or processed to generate the 360-degree image. Alternatively, camera 402 may include a single, standard camera that captures and/or combines a plurality of still images of real-world scenery 404 taken at different points in time (e.g., using a "panorama mode" of the camera or a similar feature) to capture still 360-degree images. In certain examples, camera 102 may include one or more stereoscopic cameras. Camera 402 may also use any combination of the 360-degree image capture techniques described above or any other capture techniques that may serve a particular implementation.

Subsequent to capturing raw image data representative of real-world scenery 404, camera 402 may generate from the raw image data a 360-degree image of real-world scenery 404. For example, camera 402 may be configured to automatically process the raw image data (e.g., by combining a plurality of images captured by segment capture cameras 406, by processing images captured by a fish-eye lens, etc.) to form the 360-degree image, and then may transmit data representative of the 360-degree image to backend system 408. Alternatively, camera 402 may be configured to transmit (e.g., by way of or as a part of content creator system 202) the raw image data directly to system 100, and any processing and/or combining of the raw image data may be performed within system 100.

Camera 402 may capture any real-world scenery 404 that may serve a particular embodiment. For example, real-world scenery 404 may include any indoor or outdoor real-world location such as the streets of a city, a museum, a scenic landscape, a satellite orbiting and looking down upon the Earth, the surface of another planet, or the like. Real-world scenery 404 may further include certain events such as a stock car race, a football game or other sporting event, a large-scale party such as New Year's Eve on Times Square in New York City, or other events that may interest potential users. In certain examples, real-world scenery 404 may be a setting for a fictionalized event, such as a set of a live-action virtual reality television show or movie.

In some implementations, capturing real-world scenery 404 using camera 402 may be optional. For example, a 360-degree image of scenery surrounding a center point may be completely computer-generated (e.g., animated) based on models of an imaginary world rather than captured from real-world scenery 404 by camera 402. As such, camera 402 may be omitted in certain examples.

In the description of FIG. 1, above, system 100 was described in relation to interactive media content generally. Additionally, in examples specific to virtual reality media content, system 100 may be implemented by or comprise a backend server or other computing device associated with (e.g., provided and/or managed by) a virtual reality media content service provider (e.g., a network service provider, a cable service provider, a satellite service provider, an Internet service provider, a provider of virtual reality mobile applications, etc.). System 100 may be configured to provide virtual reality media content to users (e.g., subscribers of a virtual reality media content service, users who download or otherwise acquire virtual reality mobile applications, etc.) by way of media player devices 206. To this end, system 100 may receive, generate, process, and/or maintain data representative of virtual reality media content. For example, system 100 may be configured to receive camera-captured data (e.g., video data captured by camera 402) representative of a 360-degree image of real-world scenery 404 around a center point corresponding to camera 402. If the camera-captured data is raw image data (e.g., image data captured by each of segment capture cameras 406 that has not been combined into a 360-image), system 100 may unwrap, combine (i.e., stitch together), or otherwise process the raw image data to form the 360-degree image representative of real-world scenery 404.

Based on the camera-captured data representative of real-world scenery 404 (e.g., the 360-degree image), system 100 may generate and maintain an immersive virtual reality world (i.e., data representative of an immersive virtual reality world that may be experienced by a user). For example, system 100 may generate a three-dimensional ("3D") model of the immersive virtual reality world where virtual objects may be presented along with projections of real-world scenery 100 to a user experiencing the immersive virtual reality world. To generate the immersive virtual reality world, system 100 may perform video transcoding, slicing, orchestration, modeling, and/or any other processing that may serve a particular embodiment.

As will be described in more detail below, system 100 may generate and maintain the immersive virtual reality world by generating and/or managing one or more content files including overall data representative of the immersive virtual reality world. For example, in certain implementations, system 100 may generate and maintain a single uniform-resolution content file comprising data representative of an entirety of the immersive virtual reality world encoded in a uniform resolution (e.g., encoded in a relatively high resolution). In other implementations, system 100 may generate and maintain a plurality of uniform-resolution content files that are each associated with a respective center point within the immersive virtual reality world and comprise data representative of a view of the immersive virtual reality world corresponding to the respective center point in a uniform resolution (e.g., the relatively high resolution). Examples of uniform resolution content files will be described in more detail below.

In yet other implementations, system 100 may generate and maintain a plurality of mixed-resolution content files. For example, each mixed-resolution content file may correspond to one respective content sector of a plurality of partially overlapping content sectors that together form a view (e.g., from the perspective of a single center point) of the immersive virtual reality world. More specifically, each mixed-resolution content file may comprise data representative of the plurality of content sectors (i.e., the entire view of the immersive virtual reality world), but may include the one respective content sector (i.e., the content sector to which the content file corresponds) encoded in the relatively high resolution and a remainder of the content sectors encoded in a relatively low resolution (i.e., lower than the relatively high resolution). Examples of mixed-resolution content files and immersive virtual reality worlds formed from pluralities of partially overlapping content sectors will be described in more detail below.

Figure 5:
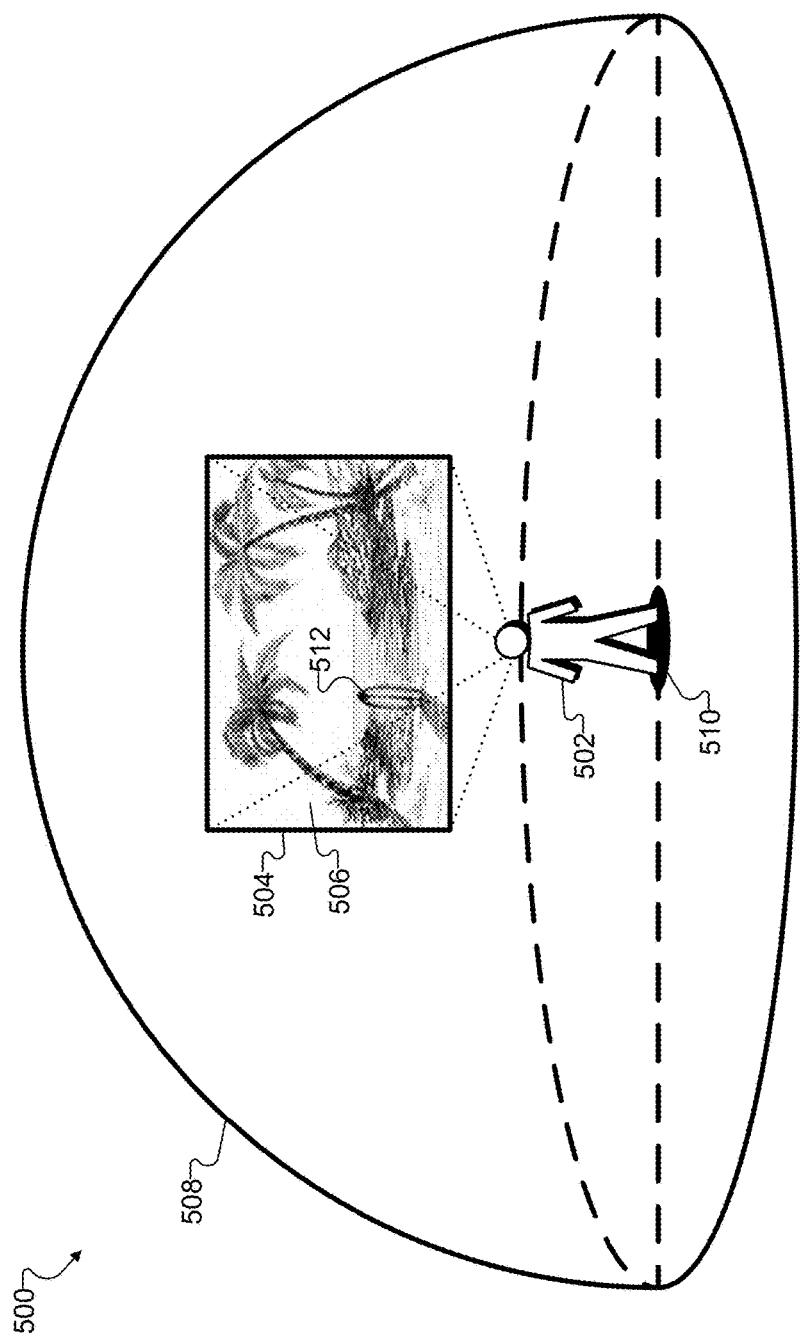
FIG. 5 illustrates an exemplary virtual reality experience in which a user is presented with an exemplary field of view that includes content of an exemplary immersive virtual reality world according to principles described herein.

FIG. 5 illustrates an exemplary virtual reality experience 500 in which a user 502 is presented with an exemplary field of view 504 that includes content 506 of an exemplary immersive virtual reality world 508. User 502 may experience immersive virtual reality world 508 ("world 508") by providing user input to dynamically change field of view 504 to display whatever content within world 508 that user 502 wishes to view. For example, the user input provided by user 502 may include an indication that user 502 wishes to look at content not currently presented within field of view 504 (i.e., content of world 508 other than content 506). As will be described in more detail below, the form that this user input takes may depend on a form factor (e.g., head-mounted virtual reality device, personal computer device, mobile device, etc.) of the media player device used by user 502.

As one example, if user 502 is experiencing world 508 by way of a media player device incorporating particular sensors (e.g., motion, directional, and/or orientation sensors), the user input may include a change to a spatial orientation of the display screen of the media player device. In other words, field of view 504 may be directed to a particular area of world 508 based on an alignment of a spatial orientation of the display screen of the media player device with the particular area of world 508. As such, the media player device may be configured to detect the spatial orientation of the display screen as user 502 experiences world 508 (e.g., by using the motion, directional, and/or orientation sensors), and may gradually replace content 506 with other content of world 508 that aligns with the spatial orientation of the display screen.

To illustrate, FIG. 5 shows that content 506 may include real-world scenery depicting a beach with palm trees. User 502 may provide user input to a media player device by which user 502 is experiencing world 508 (e.g., one of media player devices 206) to indicate that user 502 wishes to look at content to the left of content 506 currently included within field of view 504. For example, user 502 may press a left navigation key on a keyboard, perform a swipe gesture to the right on a touchscreen device, or align the spatial orientation of the display screen a bit to the left of a head-mounted device. In response, the real-world scenery (i.e., the palm trees, the water, etc.) may scroll to the right across field of view 504 to give user 502 a sensation that he or she is turning to look to the left in world 508. As content 506 scrolls off the right side of field of view 504, new content (not explicitly shown in FIG. 5) smoothly scrolls onto the left side of field of view 504. In this way, user 502 may provide user input to cause field of view 504 to present any part of world 508 that user 502 desires.

In FIG. 5, world 508 is illustrated as a semi-sphere, indicating that user 502 may look in any direction that is substantially forward, backward, left, right, and/or up. However, if user 502 directs field of view 504 down, world 508 may not include dynamic and/or real-world scenery content to be presented within field of view 504. For example, if world 508 includes a dynamic immersive virtual reality world (i.e., using a 360-degree video image), field of view 504 may present a still image representative of the ground of world 508. In other examples, field of view 504 may present nothing (i.e., a black screen), a menu, one or more virtual objects, or any other suitable image that may serve a particular implementation. In other examples, world 508 may include an entire 360-degree by 180-degree sphere so that every direction in which user 502 may direct field of view 504 is associated with dynamic and/or real-world scenery content of world 508.

As shown in FIG. 5, world 508 may appear to surround a center point 510 associated with user 502. In some embodiments, center point 510 may correspond to a location of a camera (e.g., camera 402) used to capture the real-world scenery content of world 508 (e.g., including content 506). As such, center point 510 may be static or may move through world 508 in a way that user 502 is unable to control (e.g. moving through world 508 in a same manner as camera 402 moved through real-world scenery 404 during the creation of the virtual reality media content). In other embodiments that will be described in more detail below, user 502 may be able to provide input to modify where center point 510 is located within world 508. For example, user 502 may move from one center point to another (e.g., corresponding to where each of a plurality of 360-degree cameras captured 360-degree images) within world 508 or cause center point 510 to move continuously within world 508. While center point 510 is illustrated at the feet of user 502 for simplicity of illustration, it will be understood that center point 510 may actually be located at the eye level of user 502.

Additionally, FIG. 5 shows a virtual object 512 (i.e., a surfboard), which may be inserted into world 508 by system 100 during the generation of world 508. Any virtual object may be inserted along with the real-world scenery of world 508 as may serve a particular implementation.

Figure 6:
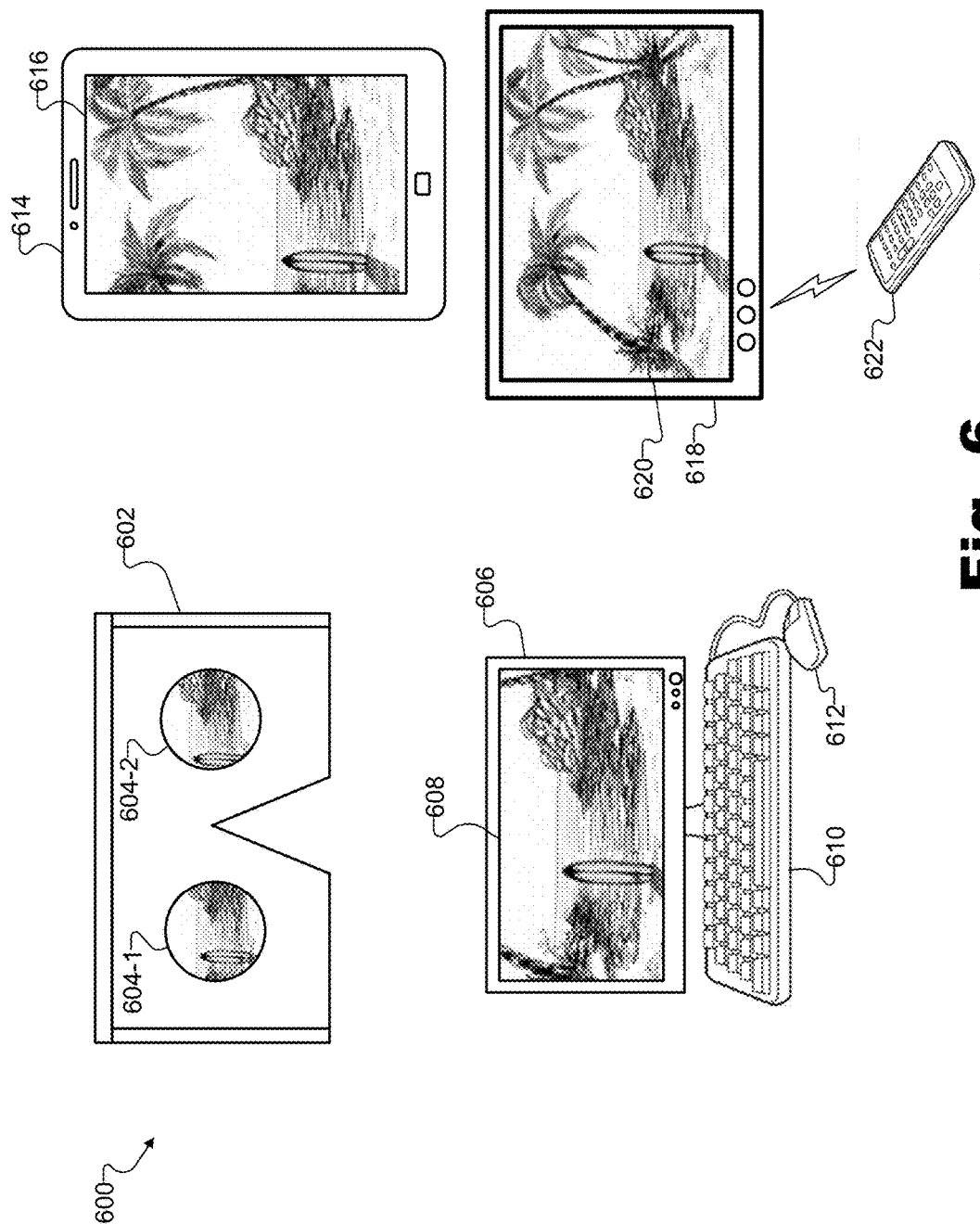
FIG. 6 illustrates exemplary media player devices configured to facilitate viewing and/or experiencing interactive media content by users according to principles described herein.

As mentioned above, different types of media player devices may provide different experiences for users (e.g., users 208, user 502, or other users described herein) by rendering portions of the overall data representative of the interactive media content in different ways, by receiving user input from users in different ways, and so forth. To illustrate, FIG. 6 illustrates exemplary media player devices 600 configured to facilitate viewing and/or experiencing interactive media content by users according to principles described herein.

As a first example of a media player device 600 that may be used to view and/or experience interactive media content, a head-mounted virtual reality device 602 may be mounted on the head of the user and arranged so that each of the user's eyes sees a distinct display screen 604 (e.g., display screens 604-1 and 604-2) within head-mounted virtual reality device 602. In some examples, a single display screen 604 may be presented and shared by both eyes of the user. In other examples, as shown, distinct display screens 604 within head-mounted virtual reality device 602 may be configured to display slightly different versions of the interactive media content (e.g., field of view 504 such as stereoscopic versions of field of view 204 that may be captured by one or more stereoscopic cameras) to give the user the sense that he or she is viewing a three-dimensional space (e.g., associated with branching narrative 300, world 508, etc.). Display screens 604 may also be configured to display the interactive media content (e.g., content 506) such that the interactive media content fills the peripheral vision of the user, providing even more of a sense of realism to the user. Moreover, head-mounted virtual reality device 602 may include motion sensors (e.g., accelerometers), directional sensors (e.g., magnetometers), orientation sensors (e.g., gyroscopes), and/or other suitable sensors to detect natural movements (e.g., head movements) of the user as the user views or experiences the interactive media content.

For example, if the user is experiencing virtual reality media content, the user may provide input indicative of a desire to move field of view 504 in a certain direction and by a certain amount in world 508 by simply turning his or her head in that direction and by that amount. As such, head-mounted virtual reality device 602 may provide the user with a natural and hands-free experience that does not require any physical console control to experience the immersive virtual reality world and that may be the most immersive virtual reality experience provided by any type of media player device.

As another example of a media player device 600, a personal computer device 606 having a display screen 608 (e.g., a monitor) may be used by the user to experience the interactive media content (e.g., branching narrative 300, world 508, etc.). Because display screen 608 may not provide the distinct stereoscopic view for each of the user's eyes and/or may not fill the user's peripheral vision, personal computer device 606 may not provide the same degree of immersiveness that head-mounted virtual reality device 602 provides (e.g., particularly for virtual reality media content). However, personal computer device 606 may be associated with other advantages such as its ubiquity among casual virtual reality users that may not be inclined to purchase or use a head-mounted virtual reality device. In some examples, personal computer device 606 may allow a user to view and/or experience interactive media content within a standard web browser so that the user may conveniently view and/or experience the interactive media content without using special devices or downloading special software. The user may provide user input to personal computer device 606 by way of a keyboard 610 (e.g., using indicated keys to select scenes 302 by way of decisions 304, using navigation keys to move field of view 504, etc.) and/or by way of a mouse 612 (e.g., by clicking on selected decisions 304, by moving mouse 612 to move field of view 504, etc.). In certain examples, a combination of keyboard 610 and mouse 612 may be used to provide user input (e.g., moving field of view 504 by way of navigation keys on keyboard 610 and clicking or otherwise interacting with objects within world 508 by way of mouse 612).

As another example of a media player device 600, a mobile device 614 having a display screen 616 may be used by the user to view and/or experience the interactive media content (e.g., branching narrative 300, world 508, etc.). Mobile device 614 may incorporate certain advantages of both head-mounted virtual reality devices and personal computer devices to provide the most versatile type of media player device for viewing and/or experiencing interactive media content, and virtual reality media content (e.g., world 508) in particular. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide the user with an immersive experience comparable to that provided by head-mounted virtual reality devices.

For example, when presenting virtual reality media content, mobile device 614 may be configured to divide display screen 616 into two versions (e.g., stereoscopic versions) of field of view 504 and to present content 506 to fill the peripheral vision of user the when mobile device 614 is mounted to the head of the user using a relatively inexpensive and commercially-available mounting apparatus (e.g., a cardboard apparatus). In other embodiments, mobile device 614 may facilitate experiencing world 508 by receiving movement-based user input at arm's length (i.e., not mounted to the head of the user but acting as a hand-held dynamic window for looking around world 508), by receiving swipe gestures on a touchscreen, or by other techniques that may serve a particular embodiment.

As one additional example of a media player device 600, a television device 618 may be used by the user to view and/or experience the interactive media content (e.g., branching narrative 300, world 508, etc.). Television device 618 may be particularly well-suited for viewing interactive television programs (e.g., similar to watching other types of television programs or movies). For example, the user may watch a scene (e.g., one of scenes 302) presented on a display screen 620 of television device 618. At the end of the scene, the user may be prompted to make a decision (e.g., one of decisions 304). The user may choose how to respond to the prompt and select a decision 304 using a remote control device 622. In other examples, television device 618 may present virtual reality content (e.g., field of view 504 of world 508) and remote control device 622 may be used to dynamically change the content of world 508 that is rendered within field of view 504 on display screen 620 of television device 618.

While examples of certain media player devices have been described, the examples are illustrative and not limiting. A media player device may include any suitable device and/or configuration of devices configured to facilitate receipt and presentation of interactive media content (e.g., virtual reality media content) according to principles described herein. For example, a media player device may include a tethered device configuration (e.g., a tethered headset device) or an untethered device configuration (e.g., a display screen untethered from a processing device). As another example, a head-mounted media player device or other media player device may be used in conjunction with a controller device such as a wearable controller (e.g., a ring controller) and/or a handheld controller.

Figure 7:
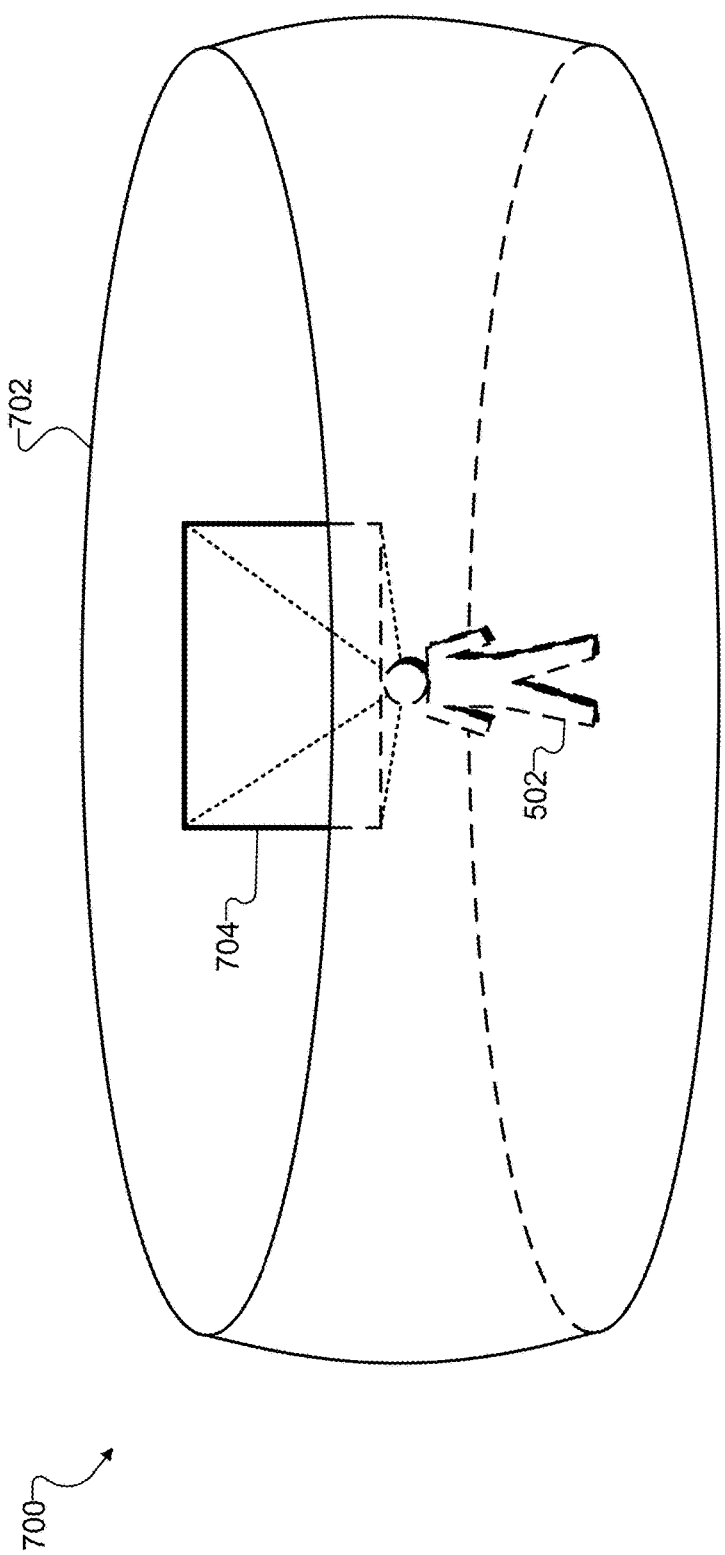
FIG. 7 illustrates an exemplary immersive virtual reality world being experienced by a user according to principles described herein.

FIG. 7 illustrates an exemplary immersive virtual reality world 700 ("world 700") being experienced by user 502 (e.g., using one of media player devices 600). For ease of illustration and explanation, world 700 is illustrated as a ring-shaped immersive virtual reality world. As such, world 700 may be formed from a 360-degree image that depicts the surroundings (e.g., real-world scenery such as real-world scenery 404 described above in relation to FIG. 4) of a center point associated with a position of user 502 within world 700 on all sides along the horizontal dimension. However, the 360-degree image of world 700 may not be a fully spherical image that depicts an entire 360-degree by 180-degree sphere surrounding the center point. Instead, the 360-degree image of world 700 may depict approximately a 360-degree by 60-degree ring around the center point that does not include surroundings of the center point directly above or below the center point. While the simple ring shape of world 700 may facilitate illustrating and describing various aspects of how system 100 may perform the point-to-multipoint delivery of the independently-controllable virtual reality media content to the media player device, it will be understood that the same principles described in relation to the embodiment of FIG. 7 may apply to embodiments that include fully spherical immersive virtual reality worlds or other suitable immersive virtual reality worlds taking the form of other suitable geometric structures (i.e., cubes, pyramids, semi-spheres, etc.). To illustrate, an example of a semi-spherical immersive virtual reality world will be described and illustrated briefly below in relation to FIG. 14.

It will be understood that the relative sizes for user 502 and world 700 may not be to scale. As shown, an entirety 702 of world 700 (e.g., as opposed to a plurality of content sectors that may form an immersive virtual reality world in other implementations, as will be described below) may virtually surround user 502 such that user 502 may view and/or experience any portion of the entirety 702 of world 700 within a field of view 704. For example, while field of view 704 is displayed on a display screen of the media player device by which user 502 is experiencing world 700), the media player device may receive a stream of a uniform-resolution content file comprising data representative of the entirety 702 of world 700 encoded in a uniform resolution (e.g., a relatively high resolution)

As used herein, a resolution may refer to any measure of a detail level or quality level represented within an encoding of virtual reality media content. For example, a high-resolution image may be a "high-definition" ("HD") image such as one that includes a particular number of rows or pixels or that is refreshed at a particular frame rate as may serve a particular implementation. Thus, as used herein, data encoded in a high resolution may be associated with a higher level of quality and/or detail than data encoded in a "low resolution," generating a more realistic-looking version of content of world 700 and/or a more desirable experience for user 502 experiencing world 700. However, data encoded in a high resolution may also utilize a larger amount of data (i.e., as compared with data encoded in a low resolution), which may necessitate more processing and network resources to process and transfer the high resolution data between system 100 and the media player device.

As used herein, content files (e.g., uniform-resolution content files, mixed-resolution content files, etc.) may include any data structure, data resource, etc., that includes data representative of content of an immersive virtual reality world. As such, content files may take any form that may serve a particular embodiment, whether or not conforming to certain norms shared by certain data structures traditionally referred to as data files. For example, content files may include a discrete and finite set of data (i.e., data representative of the content of the immersive virtual reality world) and may be maintained (e.g., stored) on a storage drive of a server (e.g., within storage facility 106 of system 100). In other examples, however, content files may include a continuous and/or potentially unbounded set of data (e.g., from a continuous data stream) and may be managed by a server by passing through the server and/or being processed by the server, but not necessarily by being maintained or stored on the server. For example, system 100 may manage a content file comprising a data stream continuously transmitted by a content creator system (e.g., content creator system 202 of FIG. 2), a 360-degree camera (e.g., camera 402 of FIG. 4), or the like.

Certain content files may include data representative of content that is all encoded in a uniform resolution (e.g., a high resolution). Such content files may be referred to as uniform-resolution content files. In contrast, as will be illustrated and described in more detail below, other content files may include data that is encoded in a plurality of different resolutions. For example a portion of the data corresponding to one content sector may be encoded at a first resolution (e.g., a high resolution), while portions of the data corresponding to a remainder of the other content sectors may be encoded at one or more lower resolutions. For example, content sectors adjacent to the content sector encoded at the first resolution may be encoded in a second resolution (i.e., a resolution lower than the first resolution), while content sectors that are not adjacent to the content sector encoded at the first resolution may be encoded in a third resolution (i.e., a resolution lower than the first and the second resolutions).

Figure 8:
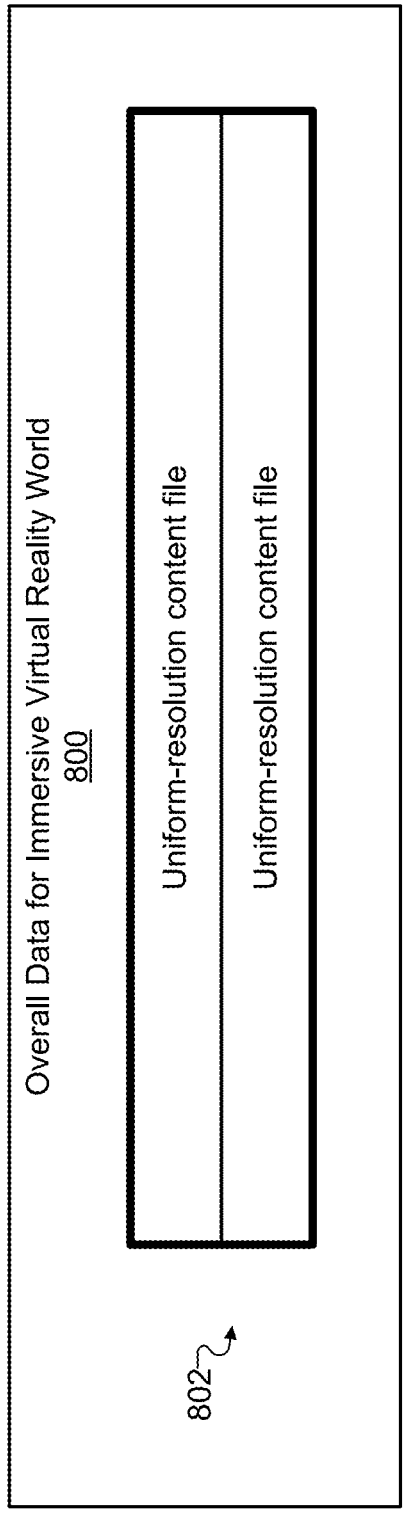
FIG. 8 illustrates exemplary overall data for the immersive virtual reality world of FIG. 7 according to principles described herein.

To illustrate, FIG. 8 illustrates exemplary overall data 800 for world 700. Specifically, as shown, overall data 800 includes a single uniform-resolution content file 802 comprising data representative of the entirety 702 of world 700 encoded in a uniform resolution (e.g., a high resolution). Overall data 800 may be stored and/or otherwise maintained on system 100 (e.g., incorporated with interactive media content data 108 within storage facility 106 as described above in relation to FIG. 1). Alternatively, overall data 800 may include streaming data being received by system 100 that may not necessarily be stored or otherwise maintained on system 100 but may nonetheless be managed by system 100 in that system 100 may process and/or stream (e.g., pass through) overall data 800 to one or more media player devices as overall data 800 is received.

For reasons that will explained in more detail below, uniform-resolution content file 802 is shown to be relatively wide (i.e., such that it cannot fit within the width of the page unless presented on two separate lines). The relatively large width indicates that uniform-resolution content file 802 may include a relatively large amount of data. The amount of data in uniform-resolution content file 802 may be associated with certain advantages and disadvantages when compared to implementations that use a plurality of smaller mixed-resolution content files, as will be described in more detail below.

To illustrate how the content of world 700 may be represented within overall data 800, FIG. 9 illustrates a portion of the content of world 700 as the content is represented within uniform-resolution content file 802. Specifically, FIG. 9 shows content of world 700 included within a portion of the entirety 702 of world 700. As shown, FIG. 9 illustrates a portion of a 360-degree image depicting a city scene included within world 700 and being experienced by user 502 by way of field of view 704. Because world 700 is being rendered for user 502 based on uniform-resolution content file 802, all of the content included within field of view 704 may be rendered in high resolution regardless of where user 502 directs field of view 704 within world 700 and/or how quickly or dramatically user 502 changes the direction in which field of view 704 is directed.

Figure 10A:
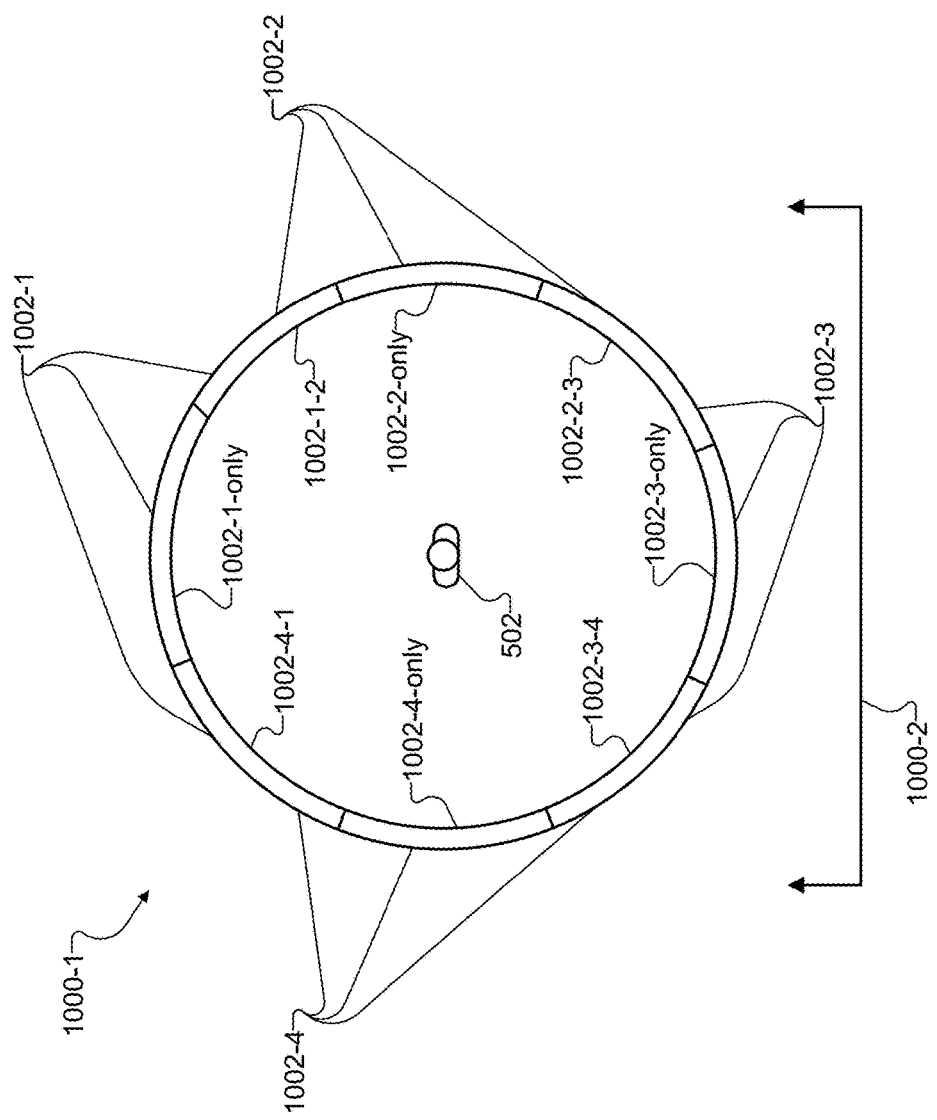
FIGS. 10A and 10B illustrate exemplary views of an exemplary immersive virtual reality world comprised of partially overlapping content sectors and being experienced by a user according to principles described herein.
Figure 10B:
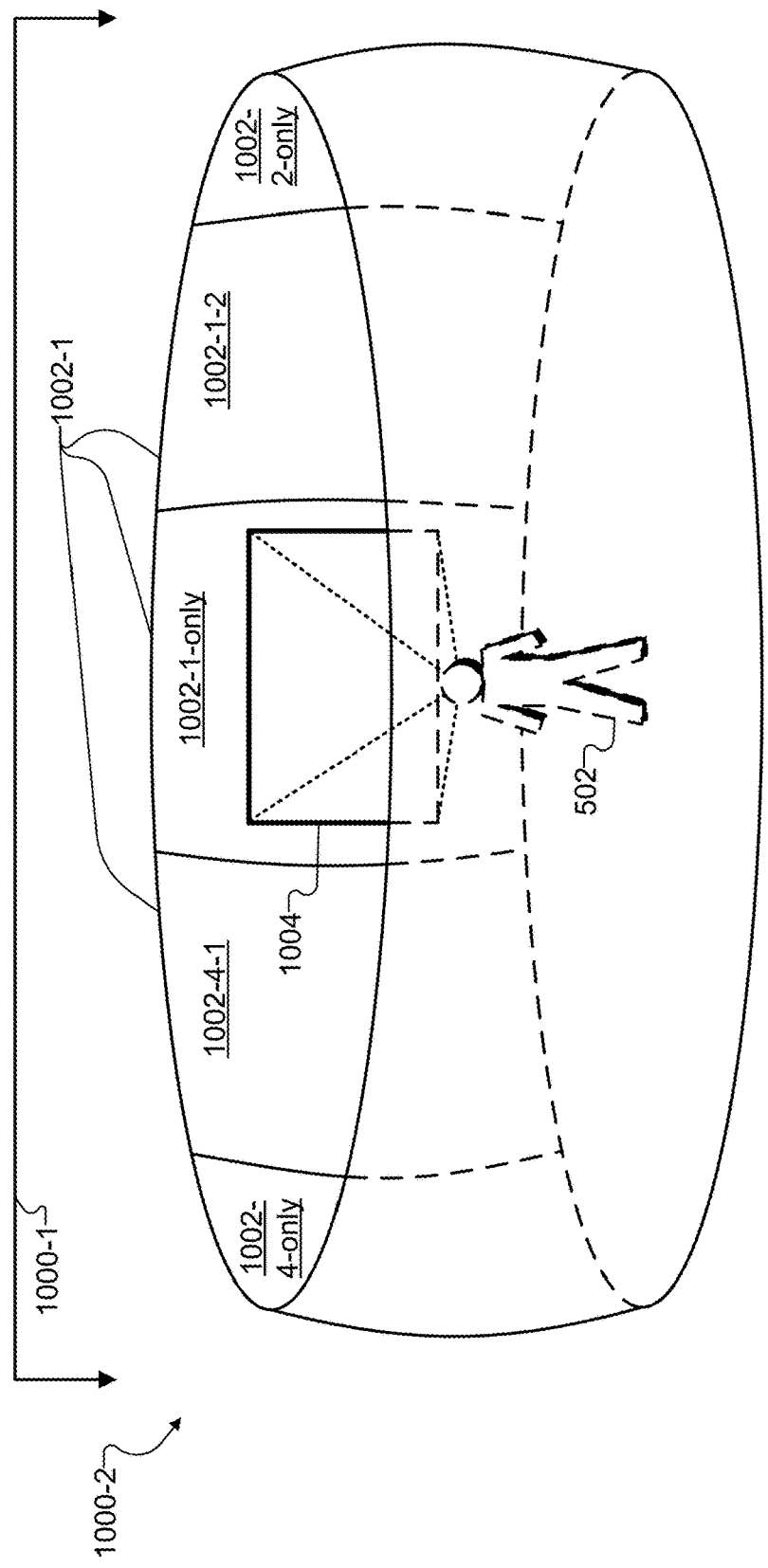

FIGS. 10A and 10B illustrate exemplary views 1000-1 (see FIG. 10A) and 1000-2 (see FIG. 10B) of an exemplary immersive virtual reality world 1000 ("world 1000") formed from partially overlapping content sectors 1002 (e.g., content sectors 1002-1, 1002-2, 1002-3, and 1002-4) and being experienced by user 502. World 1000 may be equivalent to world 700 in many or all respects except that, unlike world 700, world 1000 may be represented in overall data within system 100 using the plurality of content sectors 1002 (i.e., rather than the entirety 702) of the world. For example, like world 700, world 1000 is illustrated as a ring-shaped immersive virtual reality world for ease of illustration and explanation. Accordingly, as with world 700, while the simple ring shape of world 1000 may facilitate illustrating and describing various aspects of how system 100 may perform point-to-multipoint delivery of independently-controllable interactive media content (e.g., comprising content sectors 1002) to a plurality of media player devices, it will be understood that the same principles described in relation to the embodiment of FIGS. 10A and 10B may apply to embodiments that include fully spherical immersive virtual reality worlds or other suitable immersive virtual reality worlds taking the form of other suitable geometric structures (i.e., cubes, pyramids, semi-spheres, etc.). To illustrate, an example of a semi-spherical immersive virtual reality world will be described and illustrated briefly below in relation to FIG. 14.

As shown in FIG. 10A, view 1000-1 of world 1000 is a top view of world 1000 showing a top view of user 502 approximately at the center point of world 1000 as user 502 experiences world 1000. View 1000-1 illustrates all of content sectors 1002 around an entirety of the 360-degree ring of world 1000, as will be described in more detail below. View 1000-2 shown in FIG. 10B, in contrast, is a perspective view of world 1000 from a side of world 1000 (e.g., from an equivalent perspective as shown in FIG. 7 for world 700). While only a few of content sectors 1002 are explicitly shown in view 1000-2, view 1000-2 better illustrates what world 1000 may look like to user 502 as user 502 experiences world 1000. For example, view 1000-2 illustrates a field of view 1004 controlled by user 502 that may be used by user 502 to look anywhere within world 1000, as described above.

It will be understood that the relative sizes for user 502, world 1000, and each of content sectors 1002, may not be to scale. The number of content sectors 1002 included within world 1000, the size of each content sector 1002 in relation to the entire world 1000 and in relation to user 502, and the amount of content of world 1000 that user 502 may see within field of view 1004 at any particular time may each be configured and changed as may serve a particular implementation.

As best illustrated by view 1000-1 in FIG. 10A, world 1000 may be formed from four partially overlapping content sectors 1002 (i.e., content sectors 1002-1, 1002-2, 1002-3, and 1002-4) that are labeled around the outside of the ring of world 1000. Because content sectors 1002 are partially overlapping with each other, each content sector includes three portions, as labeled inside the ring of world 1000. First, each content sector 1002 includes a portion of world 1000 that is covered by that content sector 1002 alone. Specifically, a content sector portion 1002-1-only represents a portion of world 1000 that is only covered by content sector 1002-1, a content sector portion 1002-2-only represents a portion of world 1000 that is only covered by content sector 1002-2, a content sector portion 1002-3-only represents a portion of world 1000 that is only covered by content sector 1002-3, and a content sector portion 1002-4-only represents a portion of world 1000 that is only covered by content sector 1002-4. Additionally, each content sector 1002 includes portions of world 1000 that are covered by that content sector 1002 and are also covered by adjacent content sectors 1002 on either side of that content sector 1002 (i.e., due to the partially overlapping nature of content sectors 1002). Specifically, a content sector portion 1002-1-2 represents a portion of world 1000 that is covered by the overlap of content sectors 1002-1 and 1002-2, a content sector portion 1002-2-3 represents a portion of world 1000 that is covered by the overlap of content sectors 1002-2 and 1002-3, a content sector portion 1002-3-4 represents a portion of world 1000 that is covered by the overlap of content sectors 1002-3 and 1002-4, and a content sector portion 1002-4-1 represents a portion of world 1000 that is covered by the overlap of content sectors 1002-4 and 1002-1.

As best illustrated by view 1000-2 in FIG. 10B, user 502 may direct field of view 1004 to any portion of any content sector 1002 as user 502 experiences world 1000. For example, as shown in FIG. 10B, user 502 may be directing field of view 1004 to portion 1002-1-only of content sector 1002-1 of world 1000. As will be illustrated and described below, system 100 may provide overall data to the media player device used by user 502 that includes a plurality of mixed-resolution content files. Each mixed-resolution content file may correspond to one respective content sector 1002. More specifically, each mixed-resolution content file may comprise data representative of all of content sectors 1002 (i.e., all of world 1000), but the respective content sector 1002 to which the mixed-resolution content file corresponds may be encoded in a high resolution, while a remainder of the content sectors may be encoded in a low resolution (e.g., lower than the high resolution). While system 100 may provide overall data including mixed-resolution content files corresponding to each content sector 1002, the media player device being used by user 502 may render, at any given time, a portion of the overall data that corresponds to the mixed-resolution content file corresponding to a content sector 1002 that field of view 1004 is presenting. Thus, for example, when field of view 1004 is presenting content from content sector 1002 (e.g., from content sector portion 1002-1-only, as shown), the media player device may render a portion of the overall data that corresponds to a mixed-resolution content file corresponding to content sector 1002-1. By so doing, the content within field of view 1004 may be presented to user 502 in high resolution rather than in low resolution.

Figure 11:
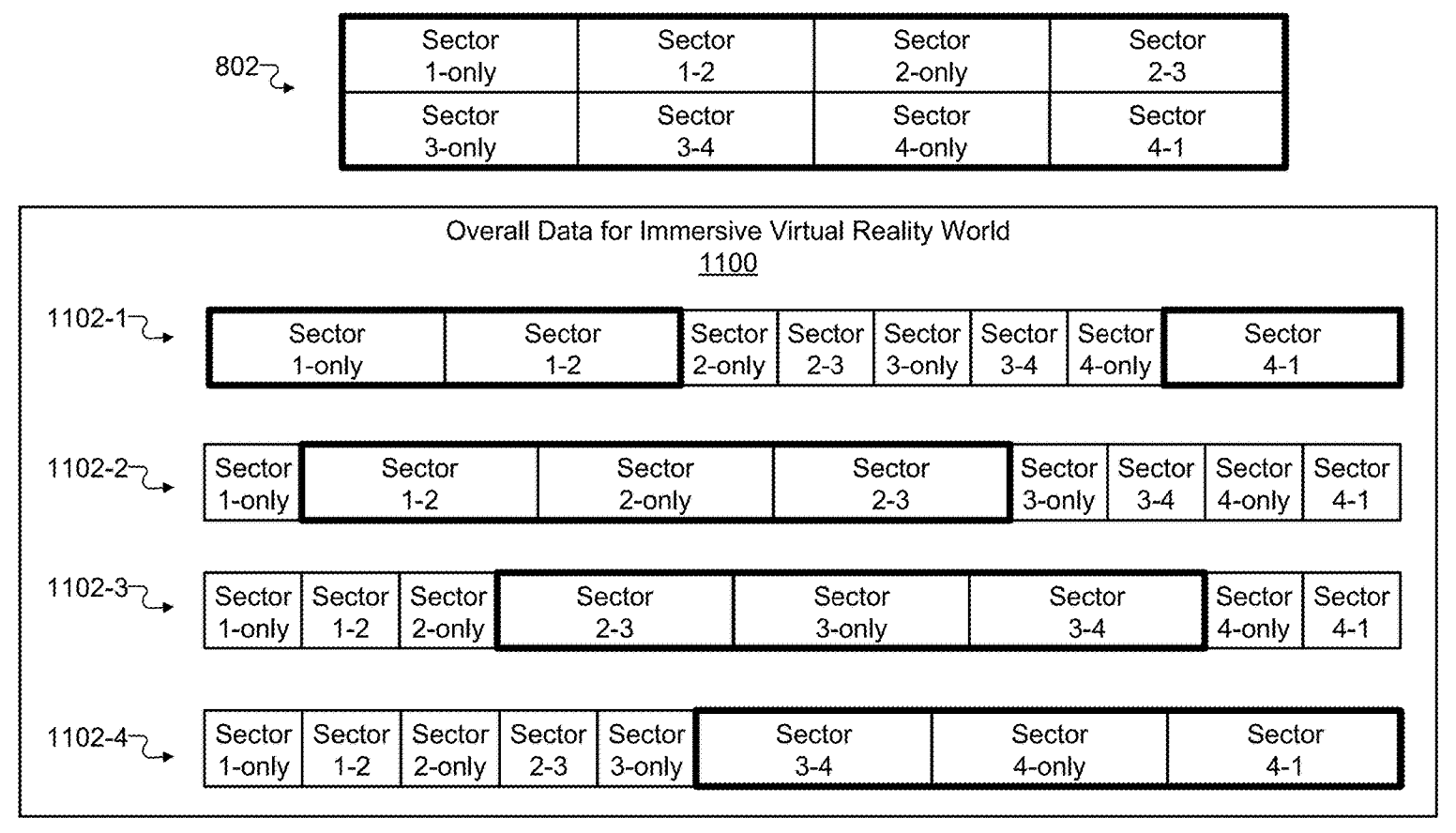

To illustrate, FIG. 11 shows exemplary overall data 1100 for world 1000, including content files 1102 (e.g., content files 1102-1, 1102-2, 1102-3, and 1102-4) corresponding to each of content sectors 1002 shown in FIG. 10A (e.g., content sectors 1002-1, 1002-2, 1002-3, and 1002-4, respectively). Overall data 1100 may be stored and/or otherwise maintained on system 100 (e.g., incorporated within interactive media content data 108 within storage facility 106 as described above in relation to FIG. 1). Alternatively, overall data 1100 may include streaming data being received by system 100 that may not necessarily be stored or otherwise maintained on system 100 but may nonetheless be managed by system 100 in that system 100 may process and/or stream (e.g., pass through) data associated with overall data 1100 to the media player device as the data is received.

In FIG. 11, uniform-resolution content file 802 is shown outside of overall data 1100. Unlike in FIG. 8, the depiction of uniform-resolution content file 802 in FIG. 11 shows how the data of uniform-resolution content file 802 is divided between different parts (e.g., content sectors 1002) of the immersive virtual reality world (e.g., world 700 or world 1000). As mentioned above in relation to FIG. 8, uniform-resolution content file 802 may be used in certain implementations, while mixed-resolution content files 1102 may be used in others. In certain examples, uniform-resolution content file 802 and mixed-resolution content files 1102 may both be used as may serve a particular embodiment.

The relative widths of uniform-resolution content file 802 and mixed-resolution content files 1102 may be indicative of the relative amount of data stored in each, and may help illustrate certain advantages and disadvantages of implementations that use large uniform-resolution content files (e.g., such as the implementation described in relation to world 700, using uniform-resolution content file 802) and implementations using a plurality of smaller mixed-resolution content files (e.g., such as the implementation described in relation to world 1000, using mixed-resolution content files 1102).

Specifically, for example, transmitting one large uniform-resolution content file (e.g., uniform-resolution content file 802) may be less burdensome for system 100 than transmitting the plurality of smaller mixed-resolution content files (e.g., mixed-resolution content files 1102). Additionally, with uniform-resolution content file 802, any portion of the entirety 702 of world 700 may be rendered within field of view 704 in high resolution at any time, which may be advantageous if user 502 dramatically alters a position of field of view 704 in a very short period of time (i.e., by quickly turning around).

However, the plurality of smaller mixed-resolution content files 1102 may provide advantages for media player devices and users. For example, while system 100 may transmit more data when using the plurality of mixed-resolution content files 1102, media player devices may use (e.g., request, accept, receive, process, and/or "tune" to) significantly less data when the plurality of mixed-resolution content files 1102 are used. Specifically, the media player devices may use only one mixed-resolution content file 1102 at a time (i.e., based on where field of view 1004 is directed within world 1000), which may generate significant advantages for the media player devices and certain components of the network.

Figure 12:
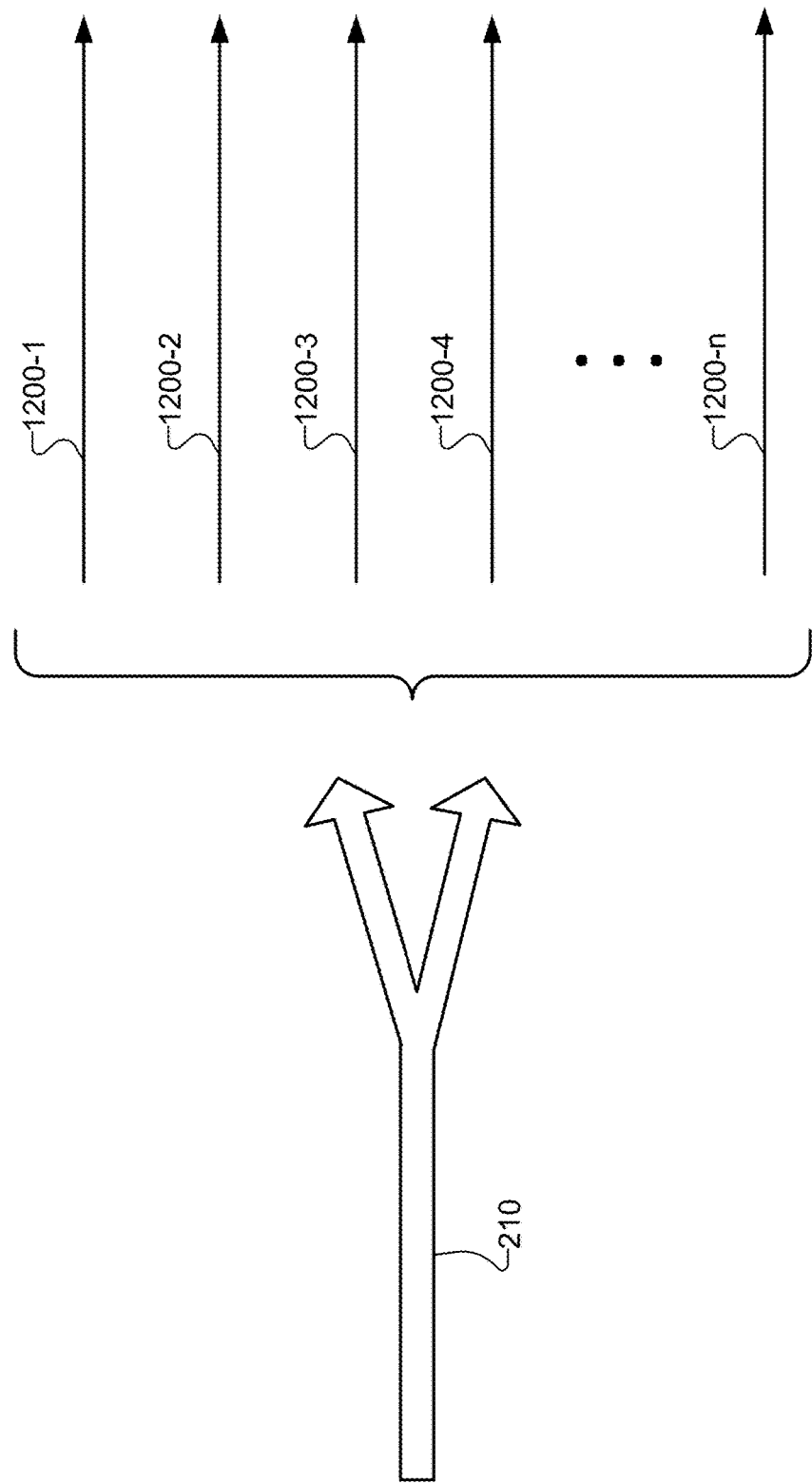
FIG. 12 illustrates exemplary channels included within an exemplary point-to-multipoint media delivery protocol according to principles described herein.

For example, FIG. 12 illustrates exemplary channels 1200 (e.g., 1200-1 through 1200-*n*) included within point-to-multipoint media delivery protocol 210 (described above in relation to FIG. 2). Within certain point-to-multipoint media delivery protocols, data may be transmitted (e.g., broadcast, multicast, etc.) over a network (e.g., network 204) to devices on a plurality of broadcast or multicast channels. Just as a television or radio device may have a plurality of channels (e.g., frequencies) available simultaneously but may be configured to tune to just one at a time, media player devices may have all of channels 1200 available at a particular time, but may only use (e.g., request, access, receive, process, and/or "tune" to) one channel 1200 at a time. As a result, by only using one smaller mixed-resolution content file 1102 at a time, a media player device may stream significantly less network data than if the media player device streamed a larger uniform-resolution content file 802. Thus, the media player device and/or certain portions of network 204 may process less network data, and a user of the media player device may be charged for less network data (e.g., if the user is on a network data usage plan with a finite amount of data usage per month).

Returning to FIG. 11, the highlighting of particular content sectors and the relative widths of particular content sector portions illustrate the different resolutions that each content sector 1002 (or content sector portion) may be encoded with within mixed-resolution content files 1102. Specifically, mixed-resolution content file 1102-1 may include high-resolution data for content sector 1002-1 (i.e., content sector portions 1-only, 1-2, and 4-1) while including lower-resolution (e.g., "standard-definition" ("SD")) data for the other content sectors 1002 (e.g., for the portions of content sectors 1002-2, 1002-3, and 1002-4 that do not overlap with content sector 1002-1 such as content sector portions 2-only, 2-3, 3-only, 3-4, and 4-only). Similarly, mixed-resolution content file 1102-2 may include high-resolution data for content sector 1002-2 (i.e., content sector portions 1-2, 2-only, and 2-3) while including lower-resolution data for the other content sectors 1002 (i.e., content sector portions 1-only, 3-only, 3-4, 4-only, and 4-1), mixed-resolution content file 1102-3 may include high-resolution data for content sector 1002-3 (i.e., content sector portions 2-3, 3-only, and 3-4) while including lower-resolution data for the other content sectors 1002 (i.e., content sector portions 1-only, 1-2, 2-only, 4-only, and 4-1), and mixed-resolution content file 1102-4 may include high-resolution data for content sector 1002-4 (i.e., content sector portions 3-4, 4-only, and 4-1) while including lower-resolution data for the other content sectors 1002 (i.e., content sector portions 1-only, 1-2, 2-only, 2-3, and 3-only).

As illustrated, the content sector portions including data encoded in the low resolution are illustrated in mixed-resolution content files 1102 as being significantly narrower than the content sector portions including data encoded in the high resolution, indicating that the low-resolution content sector portions include less data (i.e., less data for the media player devices to request, receive, stream, process, etc.). As a result, mixed-resolution content files 1102 are each significantly narrower than uniform-resolution content file 802 (uniform-resolution content file 802 is wide enough that it wraps to a second row as illustrated in FIG. 11), in which data representative of every content sector portion is encoded in the high resolution. Thus, the relative widths of uniform-resolution content file 802 and mixed-resolution content files 1102 reflect how much less data media player devices may use to render an image for the user that is usually, but not necessarily always, high resolution (e.g., potentially presenting a low resolution image temporarily when the user shifts the field of view to a new content sector 1002). Similarly, the relative widths illustrate how much more data the media player devices may use to render an image for the user that is always guaranteed to be high resolution. It will be understood that the relative widths of each content sector portion in uniform-resolution content file 802 and mixed-resolution content files 1102 are drawn for illustrative purposes only and are not to scale. In other words, the relative widths shown in FIG. 11 may be larger or smaller than actual relative data amounts in various implementations of uniform-resolution content file 802 and mixed-resolution content file 1102.

Figure 13:
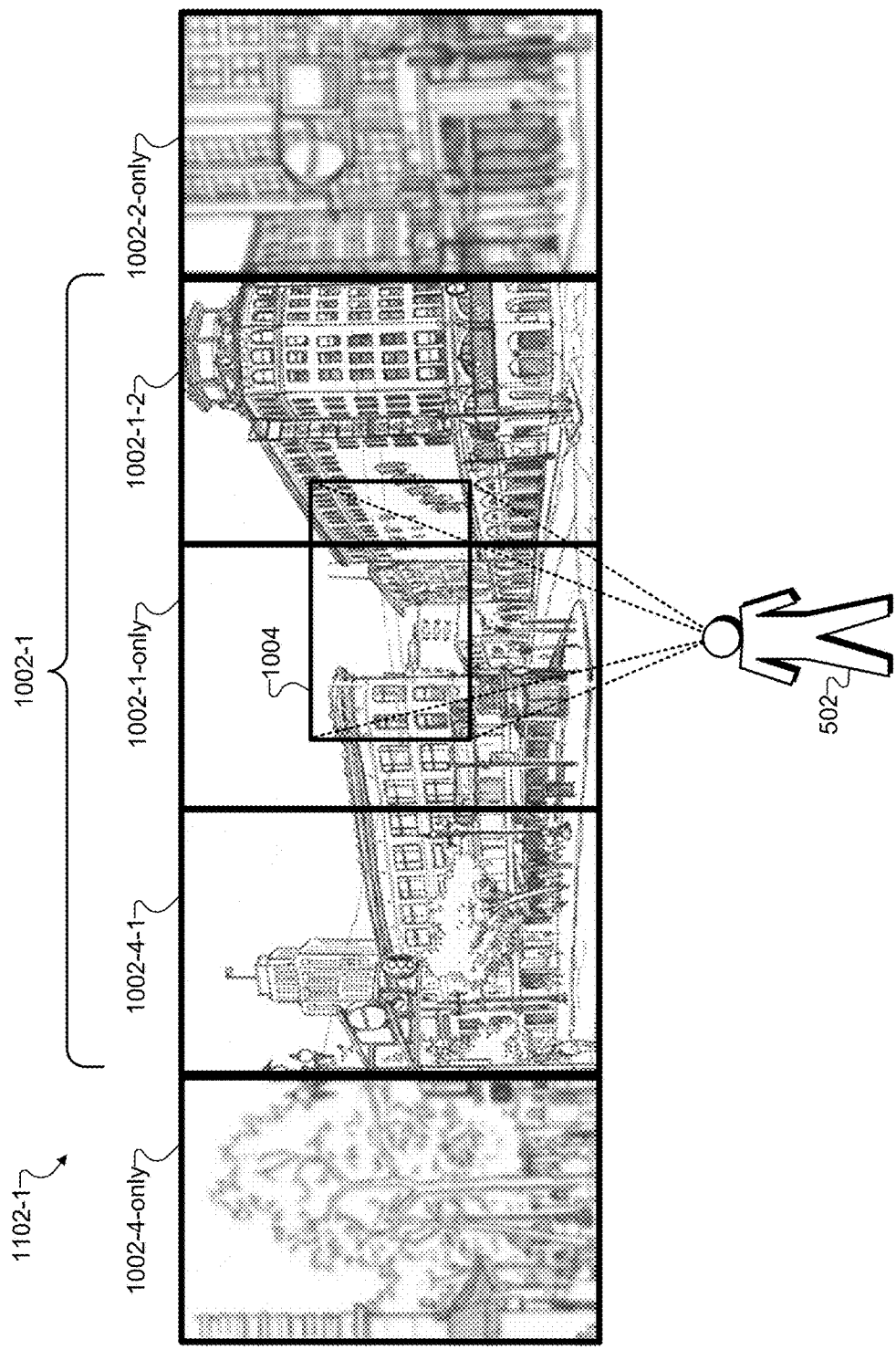
FIG. 13 illustrates content of the exemplary immersive virtual reality world of FIGS. 10A and 10B as the content may be represented within a particular content file within the overall data of FIG. 11 according to principles described herein.

To illustrate how the content of world 1000 may be represented within mixed-resolution content files 1102, FIG. 13 illustrates a portion of the content of world 1000 as the content may be represented within mixed-resolution content file 1102-1 within overall data 1100. Specifically, FIG. 13 shows the portion of the content of world 1000 included within content sector 1002-1, along with portions of the content of world 1000 adjacent to content sector 1002-1 (i.e., content included within content sector portion 1002-4-only of content sector 1002-4 and content sector portion 1002-2-only of content sector 1002-2, see FIG. 10A). FIG. 13 illustrates a portion of a 360-degree image depicting a city scene included within world 1000 and being experienced by user 502 by way of field of view 1004. As shown, the 360-degree image of world 1000 depicted in FIG. 13 is similar to the 360-degree image of world 700 depicted in FIG. 9. However, because the media player device is presenting world 1000 for user 502 based on mixed-resolution content file 1102-1 rather than uniform-resolution content file 802, the 360-degree image is not entirely represented in high resolution.

Specifically, in contrast to the 360-degree image of FIG. 9, portions of the 360-degree image that are illustrated as being outside of content sector 1002-2 (i.e., content sector portions 1002-4-only and 1002-2-only) are represented in low resolution (i.e., by being depicted as somewhat blurry in FIG. 13). Thus, as shown, all of the content included within field of view 1004 may be shown in high resolution. Similarly, as user 502 directs field of view 1004 to other content included within content sector 1002-1, the media player device may be able to render the content in high resolution based on data included within mixed-resolution content file 1102-1, as shown. However, if user 502 directs field of view 1004 to additional content that is included in another content sector (e.g., content sector 1002-2) but not included in content sector 1002-1 (e.g., content within content sector portion 1002-2-only), the media player device will not be able to render the content in high resolution based on data included within mixed-resolution content file 1102-1. Specifically, as shown, mixed-resolution content file 1102-1 includes low resolution data for content outside of content sector 1002-1, as depicted by the lower quality (i.e., blurred) content displayed in content sector portions 1002-2-only and 1002-4-only.

As a result, while mixed-resolution content file 1102-1 may provide high-resolution data as user 502 begins directing field of view 1004 into a new content sector such as content sector 1002-2 (i.e., within content sector portion 1002-1-2 of content sector 1002-2), when user 502 directs field of view 1004 deeper into content sector 1002-2 (i.e., to include content within content sector portion 1002-2-only), the media player device may need to render a different part of overall data 1100 in order to present the content within content sector portion 1002-2-only in high resolution. Specifically, the media player device may need to render a portion of mixed-resolution content file 1102-2 rather than mixed-resolution content file 1102-1 (e.g., by "tuning" from a channel 1200 that includes mixed-resolution content file 1102-1 to a channel 1200 that includes mixed-resolution content file 1102-2).

In some examples, there may be a short latency associated with accessing a new mixed-resolution content file 1102 from overall data 1100 (e.g., to request, receive, refill buffers, etc., with data from a new channel 1200). As such, the media player device may temporarily render the content of content sector portion 1002-2-only using low resolution data included within mixed-resolution content file 1102-1 until the high resolution data for content sector portion 1002-2-only has been received and/or buffered. In the same or other examples, the media player device may be configured to predict and/or preload data from other mixed-resolution content files 1102 such that high-resolution data may be ready and low-resolution data may be presented as infrequently as possible.

Additionally, in certain implementations, it may be predicted (e.g., by system 100 while generating world 1000 from data received by content creator system 202, by an operator of content creator system 202 and/or camera 402, etc.) that users are likely to direct field of view 1004 in a certain direction at a particular time. For example, an object that the user is likely to watch may cross world 1000, or another event may cause the user to turn to look in a different direction. If content sectors 1002 are static relative to world 1000, directing field of view 1004 across a relatively wide arc of world 1000 may include moving field of view 1004 from one content sector 1002 (e.g., content sector 1002-1) to another (e.g., content sector 1002-2). However, in certain implementations, one or more of content sectors 1002 may be dynamic rather than static. For example, one or more content sectors 1002 may persistently include (i.e., may follow or move along with) an image of a dynamic portion of world 1000 that is configured to move within world 1000 based on an event occurring within world 1000 (i.e., an image of an object that is moving across world 1000). As such, in these implementations, user 502 may direct field of view 1004 across a relatively wide arc of world 1000 but field of view 1004 may remain within the same content sector 1002 because the content sector 1002 may also move across world 1000 along approximately the same wide arc.

While worlds 700 and 1000 have been illustrated and described as being ring-shaped, and world 1000 has been illustrated and described as being formed from rectangular-shaped content sectors 1002, it will be understood that worlds 700 and 1000, as well as content sectors 1002, may be any shape that may serve a particular implementation. Moreover, content sectors 1002 may partially intersect to form world 1000 in any suitable way. For example, world 700 may be represented as a spherical structure within data representative of world 700 that is managed by system 100 (i.e., within uniform-resolution content file 802 of overall data 800). Similarly, world 1000 may be represented as a spherical structure within data representative of world 1000 that is managed by system 100 (i.e., within mixed-resolution content files 1102 of overall data 1100), and each content sector 1002 that together forms world 1000 may be a circular image of a portion of world 1000.

Figure 14:
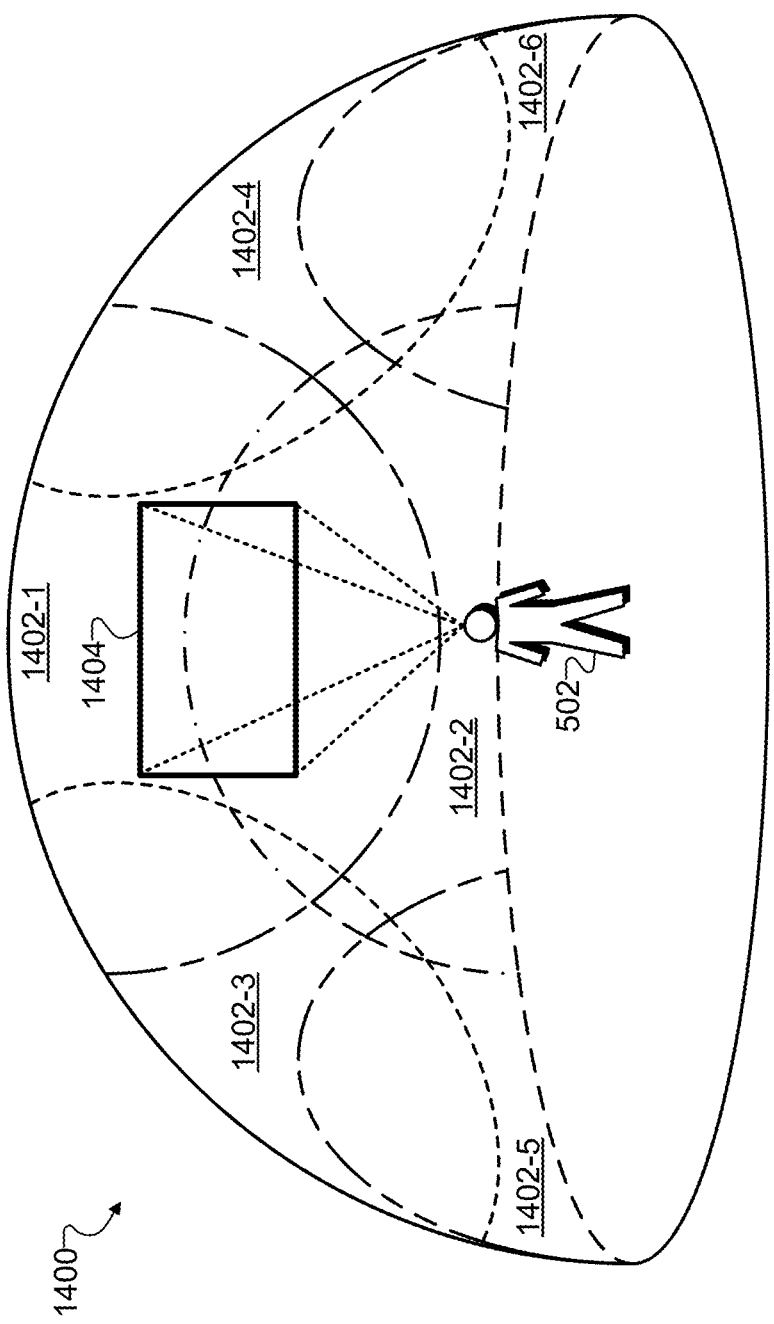
FIG. 14 illustrates an exemplary arrangement of a plurality of partially overlapping content sectors that together form an exemplary immersive virtual reality world according to principles described herein.

To illustrate, FIG. 14 illustrates an exemplary arrangement of a plurality of partially overlapping content sectors that together form an exemplary immersive virtual reality world 1400 ("world 1400"). In contrast to the ring-shaped worlds 700 and 1000 of FIGS. 6A, 6B, 10A, and 10B, world 1400 is illustrated as being semi-spherical (i.e. a 360-degree by 90-degree semi-sphere). As such, world 1400 includes a more complex arrangement of partially overlapping content sectors than world 1000. While a semi-spherical world 1400 is shown for clarity of illustration and description, it will be understood that world 1400 may include a fully-spherical world around a single center point corresponding to the user (i.e., a 360-degree by 180-degree sphere around the user) using the same principles illustrated in FIG. 14.

As shown, world 1400 is formed from an arrangement of a plurality of partially overlapping content sectors 1402 (e.g., content sectors 1402-1 through 1402-6). Content sectors 1402 may be circular (e.g., fully circular, semi-circular, etc.), and may partially overlap one another in a more complex arrangement than content sectors 1002 of FIGS. 10A and 10B. For example, content sector 1402-1 includes content sector portions that overlap with content sector 1402-2, content sector 1402-3, and content sector 1402-4. Additionally, certain content sector portions of content sector 1402-1 overlap with multiple other content sectors such as with both content sectors 1402-2 and 1402-3 or with both content sectors 1402-2 and 1402-4. As such, the media player device presenting world 1400 may include more complex logic to determine what mixed-resolution content file should be used (e.g., what channel 1200 should be "tuned" to). Content sectors 1402 may be configured so that content being rendered within field of view 1404 is always included within at least one content sector 1402 such that the media player device may always select a mixed-resolution content file corresponding to a content sector 1402 that includes the content being rendered within field of view 1404.

As described above, media player devices may render different portions of overall data (e.g., overall data 800 including uniform-resolution content file 802, overall data 1100 including mixed-resolution content file 1102, etc.) based on different user input from respective users experiencing an immersive virtual reality world (e.g., world 700, world 1000, etc.) using the media player devices. For example, as described and illustrated above, a first portion of overall data (e.g., overall data 1100) rendered within a first field of view (e.g., field of view 1004) presented on a first media player device at a particular point in time may include data from a first mixed-resolution content file (e.g., mixed-resolution content file 1102-1) corresponding to a first content sector (e.g., content sector 1002-1). At the same point in time, a second portion of the overall data rendered within a second field of view presented on a second media player device may include data from a second mixed-resolution content file (e.g., mixed-resolution content file 1102-2) corresponding to a second content sector (e.g., content sector 1002-2). In other words, two users may perceive that they are each standing at a single center point (e.g., a common center point) but may be looking in different directions within the immersive virtual reality world. Moreover, both users may be presented with high resolution images of the portion of the immersive virtual reality world they are experiencing, because the media player device associated with each user may render data from a different mixed-resolution content file.

In a similar way that system 100 provides overall data that includes a plurality of mixed-resolution content files that each correspond to a particular content sector encoded in a high resolution, system 100 may provide overall data that includes a plurality of uniform-resolution content files that are each associated with different center points within the immersive virtual reality world. For example, each uniform-resolution content file may comprise data representative of a view of the immersive virtual reality world corresponding to the respective center point of each uniform-resolution content file. As such, at a particular point in time, a first portion of the overall data may be rendered within a first field of view that includes data from a first uniform-resolution content file associated with a first center point within the immersive virtual reality world. At the same point in time, a second portion of the overall data may be rendered within a second field of view that includes data from a second uniform-resolution content file associated with a second center point within the immersive virtual reality world. In other words, two users may perceive that they are each standing at different center points within the same immersive virtual reality world, and each user may look in any direction within the immersive virtual reality world. Moreover, both users may be presented with high resolution images of the portion of the immersive virtual reality world they are experiencing, because the media player device associated with each user may render data from uniform-resolution content files.

Figure 15:
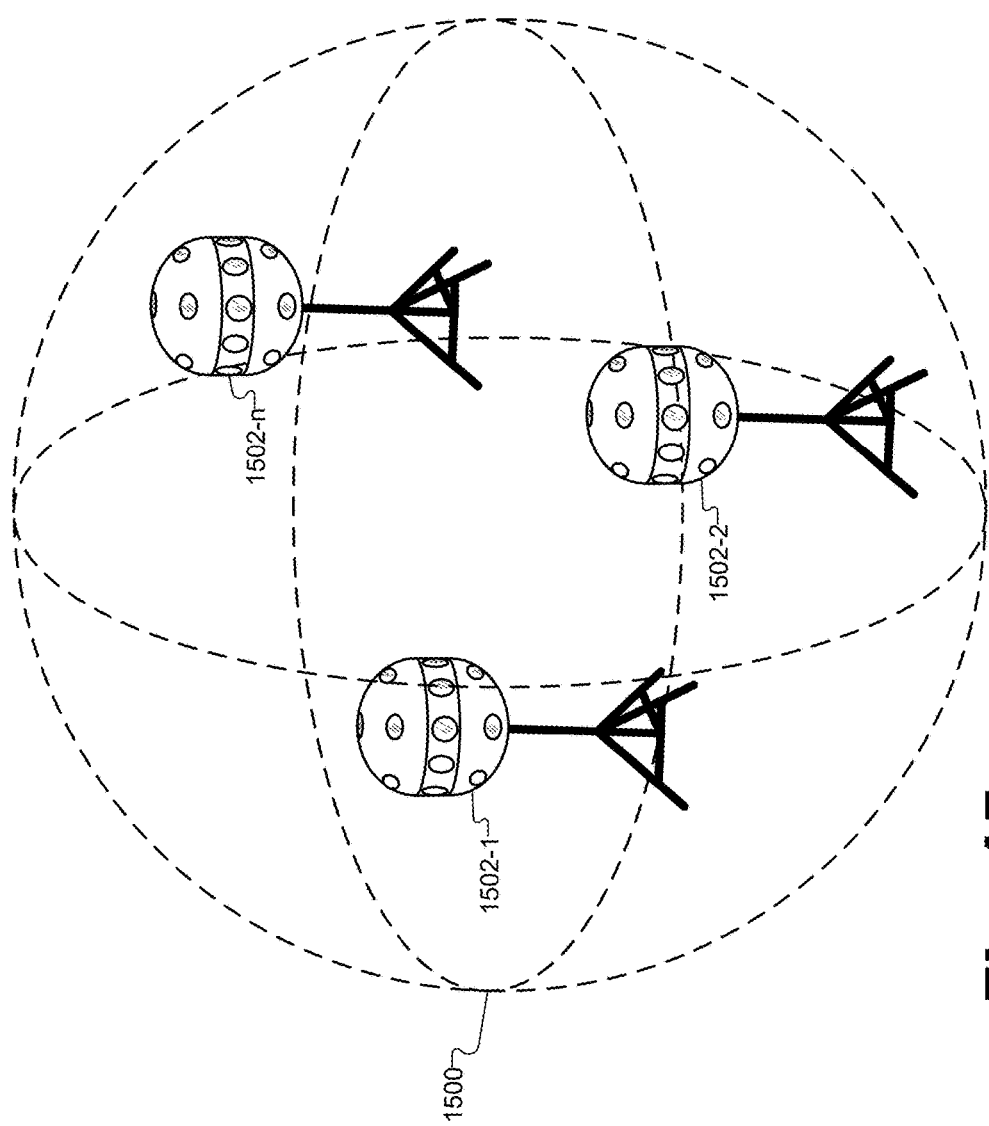
FIG. 15 illustrates a plurality of exemplary 360-degree cameras arranged to capture real-world scenery from which an immersive virtual reality world may be generated according to principles described herein.

To illustrate, FIG. 15 shows a plurality of exemplary 360-degree cameras arranged to capture real-world scenery 1500 from which an immersive virtual reality world may be generated. Specifically, 360-degree cameras 1502 (e.g., cameras 1502-1 through 1502-*n*) may be arranged to capture real-world scenery 1500 from a plurality of locations within the real world. In some examples, the plurality of locations within the real world may be in relatively close proximity to one another. For example, the plurality of locations may include different locations within a single room or a single building. The plurality of locations may include various locations in field, court, track, etc., where a sporting event may be taking place (e.g., different locations on a football field or basketball court, different locations around a racetrack, etc.). Respective 360-degree images captured by each camera 1502 may then be used (e.g., by system 100, content creator 202, etc.) to generate a view of an immersive virtual reality world from a perspective of a center point that corresponds to the respective location of each camera 1502. As a result, users experiencing the immersive virtual reality world may move from center point to center point within the immersive virtual reality world to experience the immersive virtual reality world from different center points corresponding to the locations in the real world where cameras 1502 were placed.

In some examples, uniform-resolution content files representative of different center points of the immersive virtual reality world may each be provided by system 100 by way of a point-to-multipoint media delivery protocol on separate channels (e.g., such as channels 1200, described above in relation to FIG. 12). As such, a user experiencing virtual reality media content that includes a car race may provide user input to a media player device he or she is using to move from a first center point (e.g., located at a particular turn on a racetrack in the immersive virtual reality world) to a second center point (e.g., located at a finish line of the racetrack in the immersive virtual reality world). As a result, the media player device may automatically switch from "tuning" to a first channel that includes a uniform-resolution media content file representative of the immersive virtual reality world from the perspective of the location at the particular turn of the racetrack, to a second channel that includes a uniform-resolution media content file representative of the immersive virtual reality world from the perspective of the location at the finish line.

Figure 16:
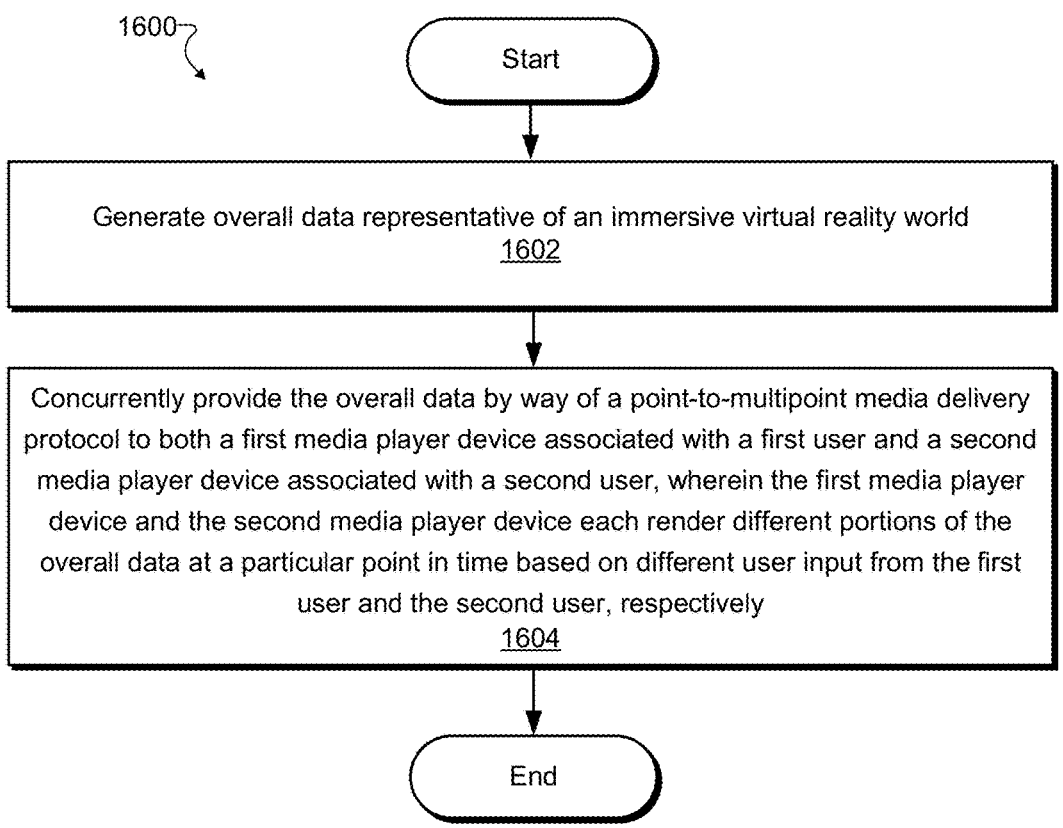
FIGS. 16 and 17 illustrate exemplary methods for point-to-multipoint delivery of independently-controllable interactive media content according to principles described herein.

FIG. 16 illustrates an exemplary method 1600 for point-to-multipoint delivery of independently-controllable interactive media content. While FIG. 16 illustrates exemplary operations according to one embodiment, other embodiments may omit, add to, reorder, and/or modify any of the operations shown in FIG. 16. One or more of the operations shown in FIG. 16 may be performed by system 100 and/or any implementation thereof.

In operation 1602, an interactive media content provider system may generate overall data representative of an immersive virtual reality world. Operation 1602 may be performed in any of the ways described herein.

In operation 1604, the interactive media content provider system may concurrently provide the overall data to both a first media player device associated with a first user and a second media player device associated with a second user. For example, the interactive media content provider system may concurrently provide the overall data to both media player devices by way of a point-to-multipoint media delivery protocol. In certain examples, the first media player device may be configured to render a first portion of the overall data within a first field of view presented on a display screen of the first media player device. The first field of view may include content of a first observed area of the immersive virtual reality world to which the first user may direct the first field of view. Similarly, the second media player device may be configured to render a second portion of the overall data within a second field of view presented on a display screen of the second media player device. The second field of view may include content of a second observed area of the immersive virtual reality world to which the second user may direct the second field of view.

Operation 1604 may be performed in any of the ways described herein. For example, in certain implementations, the first portion of the overall data may dynamically change to continually correspond to the first observed area as the first user experiences the immersive virtual reality world, and the second portion of the overall data may dynamically change to continually correspond to the second observed area as the second user experiences the immersive virtual reality world. As such, the first field of view and the second field of view may be independently directed by the first user and the second user, respectively, such that the first portion of the overall data rendered within the first field of view is different from the second portion of the overall data rendered within the second field of view at a particular point in time.

Figure 17:
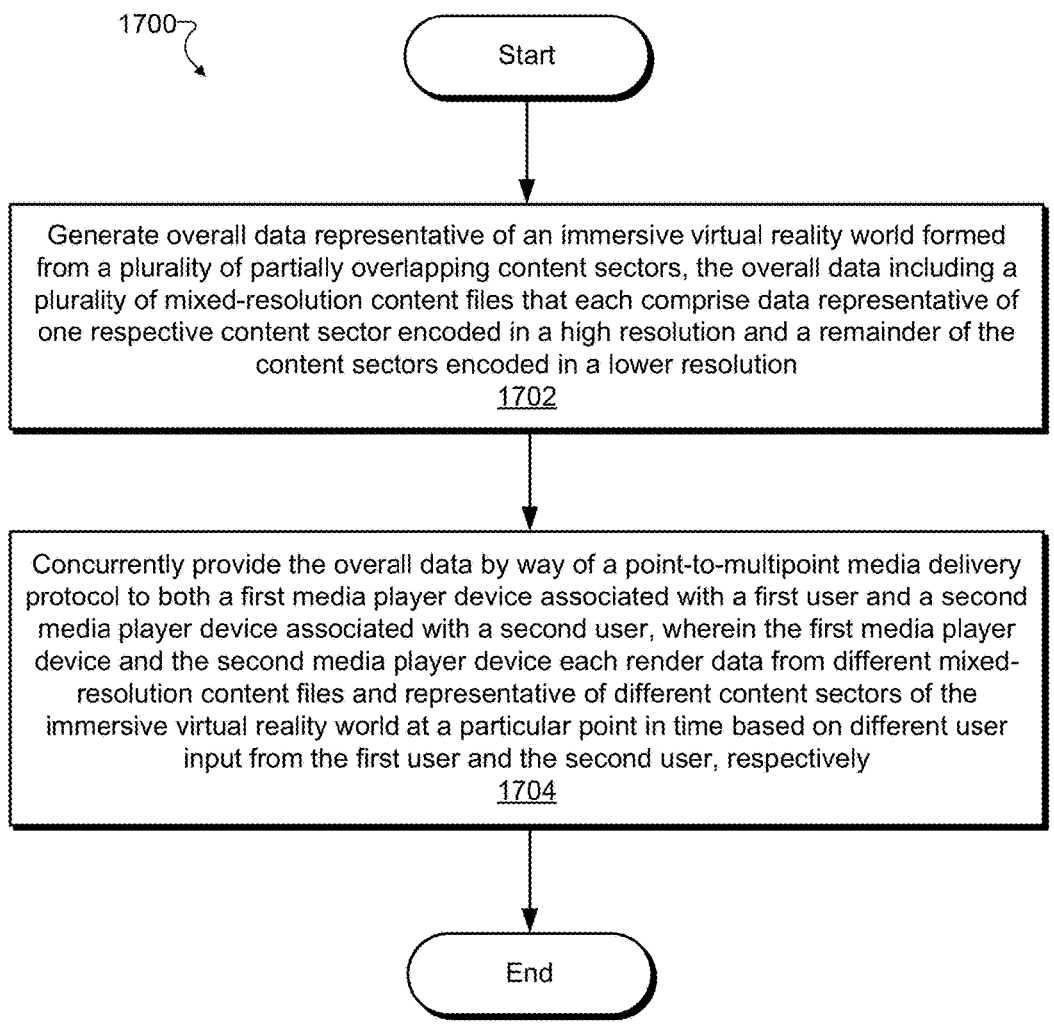

FIG. 17 illustrates an exemplary method 1700 for point-to-multipoint delivery of independently-controllable interactive media content. While FIG. 17 illustrates exemplary operations according to one embodiment, other embodiments may omit, add to, reorder, and/or modify any of the operations shown in FIG. 17. One or more of the operations shown in FIG. 17 may be performed by system 100 and/or any implementation thereof.

In operation 1702, an interactive media content provider system may generate overall data representative of an immersive virtual reality world. For example, the overall data may include a plurality of mixed-resolution content files that each correspond to one respective content sector of a plurality of partially overlapping content sectors that together form a view of the immersive virtual reality world (e.g., a view corresponding to a single center point). Each of the mixed-resolution content files may comprise data representative of the plurality of partially overlapping content sectors in which the one respective content sector (i.e., the content sector to which the particular mixed-resolution content file corresponds) is encoded in a high resolution and in which a remainder of the content sectors are encoded in a low resolution (e.g., a resolution lower than the high resolution). Operation 1702 may be performed in any of the ways described herein.

In operation 1704, the interactive media content provider system may concurrently provide the overall data to both a first media player device associated with a first user and a second media player device associated with a second user. For example, the interactive media content provider system may concurrently provide the overall data to the media player devices by way of a point-to-multipoint media delivery protocol. In certain examples, the first media player device may be configured to render a first portion of the overall data within a first field of view presented on a display screen of the first media player device. The first field of view may include content of a first observed area of the immersive virtual reality world to which the first user may direct the first field of view. Similarly, the second media player device may be configured to render a second portion of the overall data within a second field of view presented on a display screen of the second media player device. The second field of view may include content of a second observed area of the immersive virtual reality world to which the second user may direct the second field of view.

Operation 1704 may be performed in any of the ways described herein. For example, in certain implementations, the first portion of the overall data may dynamically change to continually correspond to the first observed area as the first user experiences the immersive virtual reality world, and the second portion of the overall data may dynamically change to continually correspond to the second observed area as the second user experiences the immersive virtual reality world. As such, the first field of view and the second field of view may be independently directed by the first user and the second user, respectively, such that the first portion of the overall data rendered within the first field of view includes data from a first mixed-resolution content file corresponding to a first content sector of the plurality of partially overlapping content sectors and the second portion of the overall data rendered within the second field of view includes data from a second mixed-resolution content file corresponding to a second content sector of the plurality of partially overlapping content sectors at a particular point in time.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 18:
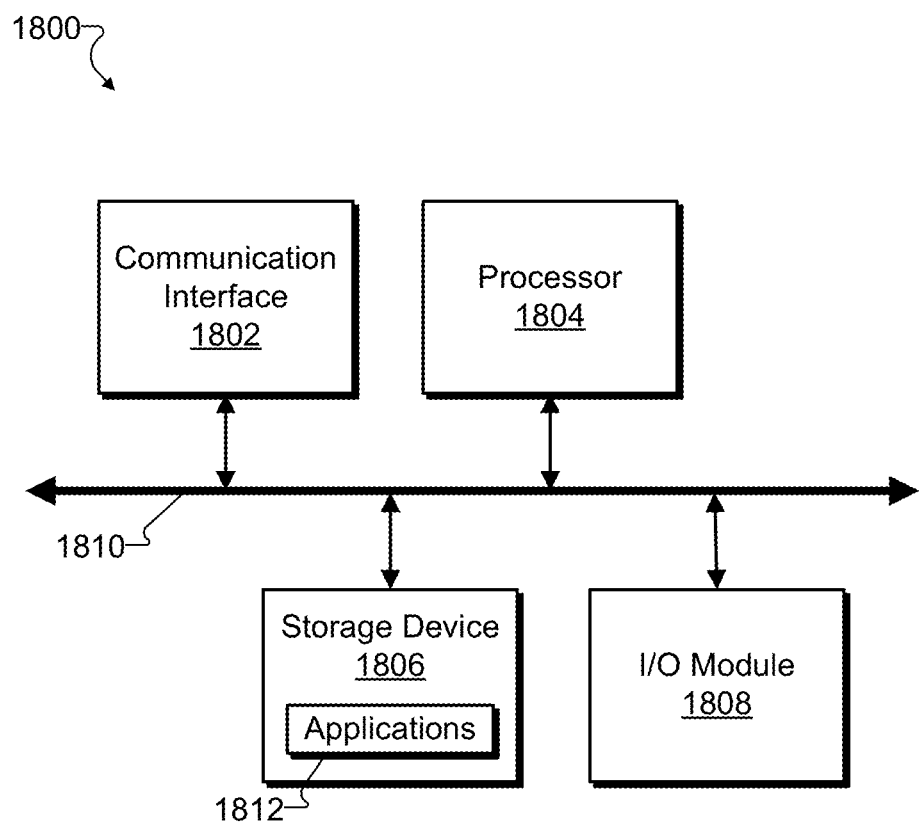
FIG. 18 illustrates an exemplary computing device according to principles described herein.

FIG. 18 illustrates an exemplary computing device 1800 that may be specifically configured to perform one or more of the processes described herein. As shown in FIG. 18, computing device 1800 may include a communication interface 1802, a processor 1804, a storage device 1806, and an input/output ("I/O") module 1808 communicatively connected via a communication infrastructure 1810. While an exemplary computing device 1800 is shown in FIG. 18, the components illustrated in FIG. 18 are not intended to be limiting. Additional or alternative components may be used in other embodiments. Components of computing device 1800 shown in FIG. 18 will now be described in additional detail.

Communication interface 1802 may be configured to communicate with one or more computing devices. Examples of communication interface 1802 include, without limitation, a wired network interface (such as a network interface card), a wireless network interface (such as a wireless network interface card), a modem, an audio/video connection, and any other suitable interface.

Processor 1804 generally represents any type or form of processing unit capable of processing data or interpreting, executing, and/or directing execution of one or more of the instructions, processes, and/or operations described herein. Processor 1804 may direct execution of operations in accordance with one or more applications 1812 or other computer-executable instructions such as may be stored in storage device 1806 or another computer-readable medium.

Storage device 1806 may include one or more data storage media, devices, or configurations and may employ any type, form, and combination of data storage media and/or device. For example, storage device 1806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1806. For example, data representative of one or more executable applications 1812 configured to direct processor 1804 to perform any of the operations described herein may be stored within storage device 1806. In some examples, data may be arranged in one or more databases residing within storage device 1806.

I/O module 1808 may include one or more I/O modules configured to receive user input and provide user output. One or more I/O modules may be used to receive input for a single virtual reality experience. I/O module 2008 may include any hardware, firmware, software, or combination thereof supportive of input and output capabilities. For example, I/O module 1808 may include hardware and/or software for capturing user input, including, but not limited to, a keyboard or keypad, a touchscreen component (e.g., touchscreen display), a receiver (e.g., an RF or infrared receiver), motion sensors and/or one or more input buttons.

I/O module 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1800. For example, one or more applications 1812 residing within storage device 1806 may be configured to direct processor 1804 to perform one or more processes or functions associated with any of facilities 102-104 of system 100 (see FIG. 1). Likewise, storage facility 106 of system 100 may be implemented by or within storage device 1806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    at least one physical computing device that:
        generates a plurality of different content files that each include data representative of content of a virtual reality world, the plurality of different content files comprising at least one of
            a plurality of uniform-resolution content files that each are encoded in a uniform resolution, that each are associated with a different respective center point within the virtual reality world, and that each comprise data representative of a different view of the virtual reality world corresponding to the respective center point of each uniform-resolution content file, and
            a plurality of mixed-resolution content files that each correspond to one respective content sector of a plurality of partially overlapping content sectors that together form a view of the virtual reality world associated with a single center point, and that each comprise data representative of the plurality of partially overlapping content sectors in which the one respective content sector is encoded in a high resolution and in which a remainder of the content sectors are encoded in a low resolution lower than the high resolution; and
        provides the plurality of different content files to a media player device by way of a network.

2. The system of claim 1, wherein:
    the at least one physical computing device provides the plurality of different content files concurrently to the media player device and an additional media player device;
    the media player device is associated with a first user and is configured to render, within a first field of view presented on a display screen of the media player device, a portion of a first content file included in the plurality of different content files, the portion of the first content file representative of content of a first observed area of the virtual reality world to which the first user directs the first field of view; and
    the additional media player device is associated with a second user and is configured to render, within a second field of view presented on a display screen of the additional media player device, a portion of a second content file included in the plurality of different content files, the portion of the second content file representative of content of a second observed area of the virtual reality world to which the second user directs the second field of view.

3. The system of claim 2, wherein:
the portion of the first content file dynamically changes to continually represent content of the first observed area as the first user experiences the virtual reality world;
the portion of the second content file dynamically changes to continually represent content of the second observed area as the second user experiences the virtual reality world; and
the first and second fields of view are independently directed by the first and second users, respectively, such that the portion of the first content file rendered within the first field of view is different from the portion of the second content file rendered within the second field of view.

4. The system of claim 1, wherein:
the plurality of different content files comprises the plurality of mixed-resolution content files; and
the one respective content sector to which each content file in the plurality of different content files corresponds is a different respective content sector for each content file.

5. The system of claim 1, wherein:
the plurality of different content files comprises the plurality of mixed-resolution content files;
the view of the virtual reality world is represented, within the plurality of mixed-resolution content files, as a spherical structure around the single center point; and
the plurality of partially overlapping content sectors includes a first content sector and a second content sector that are partially overlapping with one another and that are each partially overlapping with at least two additional content sectors included within the plurality of partially overlapping content sectors.

6. The system of claim 1, wherein:
the plurality of different content files comprises the plurality of uniform-resolution content files; and
the at least one physical computing device provides each uniform-resolution content file in the plurality of uniform-resolution content files over the network on a separate multicast channel.

7. The system of claim 1, wherein:
the plurality of different content files comprises the plurality of mixed-resolution content files; and
the at least one physical computing device provides each mixed-resolution content file in the plurality of mixed-resolution content files over the network on a separate multicast channel.

8. The system of claim 1, wherein:
the content files in the plurality of different content files are implemented as continuous data streams; and
the at least one physical computing device provides the plurality of different content files by processing and continuously transmitting the continuous data streams.

9. The system of claim 1, wherein:
the at least one physical computing device further provides the plurality of different content files to an additional media player device concurrently with the providing of the plurality of different content files to the media player device; and
the concurrent providing of the plurality of different content files to the media player device and to the additional media player device is performed by way of the network using a Multimedia Broadcast Multicast Service point-to-multipoint media delivery protocol performed using a Long-Term Evolution wireless platform.

10. The system of claim 1, wherein:
the at least one physical computing device further receives data representative of camera-captured real-world scenery, the data representative of the camera-captured real-world scenery captured by a video camera arranged to capture a 360-degree image of the real-world scenery around a center point corresponding to the video camera; and
the at least one physical computing device generates the plurality of different content files based on the received data representative of the camera-captured real-world scenery.

11. A media player device comprising:
a display screen; and
at least one physical computing device that:
  detects user input provided by a user associated with the media player device,
  accesses, based on the detected user input, one or more content files from a plurality of different content files provided to the media player device by an interactive media content provider system and by way of a network, the plurality of different content files each including data representative of content of a virtual reality world and the plurality of different content files comprising at least one of
    a plurality of uniform-resolution content files that each are encoded in a uniform resolution, that each are associated with a different respective center point within the virtual reality world, and that each comprise data representative of a different view of the virtual reality world corresponding to the respective center point of each uniform-resolution content file, and
    a plurality of mixed-resolution content files that each correspond to one respective content sector of a plurality of partially overlapping content sectors that together form a view of the virtual reality world associated with a single center point, and that each comprise data representative of the plurality of partially overlapping content sectors in which the one respective content sector is encoded in a high resolution and in which a remainder of the content sectors are encoded in a low resolution lower than the high resolution, and
  presents, to the user by way of the display screen and based on the one or more content files, the content of the virtual reality world.

12. The media player device of claim 11, wherein:
the plurality of different content files comprises the plurality of mixed-resolution content files; and
the one respective content sector to which each content file in the plurality of different content files corresponds is a different respective content sector for each content file.

13. The media player device of claim 11, wherein:
the plurality of different content files comprises the plurality of mixed-resolution content files;
the view of the virtual reality world is represented, within the plurality of mixed-resolution content files, as a spherical structure around the single center point; and
the plurality of partially overlapping content sectors includes a first content sector and a second content sector that are partially overlapping with one another and that are each partially overlapping with at least two additional content sectors included within the plurality of partially overlapping content sectors.

14. The media player device of claim 11, wherein:
the content files in the plurality of different content files are implemented as continuous data streams; and
the at least one physical computing device accesses the plurality of different content files by continuously receiving the continuous data streams as the interactive media content provider system processes and continuously transmits the continuous data streams.

15. The media player device of claim 11, wherein the at least one physical computing device accesses the one or more content files from the plurality of different content files by way of the network using a Multimedia Broadcast Multicast Service point-to-multipoint media delivery protocol performed using a Long-Term Evolution wireless platform, the Multimedia Broadcast Multicast Service point-to-multipoint media delivery protocol configured to allow the interactive media content provider system to provide the plurality of different content files to the media player device concurrently with providing the plurality of different content files to an additional media player device.

16. The media player device of claim 11, further comprising:
a head-mounted virtual reality device within which the display screen is disposed;
motion sensors disposed within the head-mounted virtual reality device;
directional sensors disposed within the head-mounted virtual reality device; and
orientation sensors disposed within the head-mounted virtual reality device.

17. The media player device of claim 11, wherein the at least one physical computing device accesses the one or more content files from the plurality of different content files by accessing a plurality of content files from the plurality of different content files one content file at a time.

18. A method comprising:
generating, by an interactive media content provider system, a plurality of different content files that each include data representative of content of a virtual reality world, the plurality of different content files comprising at least one of
a plurality of uniform-resolution content files that each are encoded in a uniform resolution, that each are associated with a different respective center point within the virtual reality world, and that each comprise data representative of a different view of the virtual reality world corresponding to the respective center point of each uniform-resolution content file, and
a plurality of mixed-resolution content files that each correspond to one respective content sector of a plurality of partially overlapping content sectors that together form a view of the virtual reality world associated with a single center point, and that each comprise data representative of the plurality of partially overlapping content sectors in which the one respective content sector is encoded in a high resolution and in which a remainder of the content sectors are encoded in a low resolution lower than the high resolution; and
providing, by the interactive media content provider system, the plurality of different content files to a media player device by way of a network.

19. The method of claim 18, wherein:
the providing of the plurality of different content files is performed by concurrently providing the plurality of different content files to the media player device and an additional media player device;
the media player device is associated with a first user and is configured to render, within a first field of view presented on a display screen of the first media player device, a portion of a first content file included in the plurality of different content files, the portion of the first content file representative of content of a first observed area of the virtual reality world to which the first user directs the first field of view; and
the additional media player device is associated with a second user and is configured to render, within a second field of view presented on a display screen of the additional media player device, a portion of a second content file included in the plurality of different content files, the portion of the second content file representative of content of a second observed area of the virtual reality world to which the second user directs the second field of view.

20. The method of claim 18, embodied as computer-executable instructions on at least one non-transitory computer-readable medium.

* * * * *